US008656186B2

(12) United States Patent
Greco et al.

(10) Patent No.: US 8,656,186 B2
(45) Date of Patent: *Feb. 18, 2014

(54) USE OF INDIRECT DATA KEYS FOR ENCRYPTED TAPE CARTRIDGES

(75) Inventors: Paul M. Greco, Tucson, AZ (US); Shai Halevi, Elmsford, NY (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 723 days.

This patent is subject to a terminal disclaimer.

(21) Appl. No.: 11/742,837

(22) Filed: May 1, 2007

(65) Prior Publication Data

US 2008/0273697 A1 Nov. 6, 2008

(51) Int. Cl.
*H04L 29/06* (2006.01)

(52) U.S. Cl.
USPC .......................................................... 713/193

(58) Field of Classification Search
USPC .......................................... 380/201, 284, 277
See application file for complete search history.

(56) References Cited

U.S. PATENT DOCUMENTS

| 6,289,102 | B1 | 9/2001 | Ueda et al. |
| 7,792,300 | B1* | 9/2010 | Caronni ........................ 380/277 |
| 2003/0152222 | A1 | 8/2003 | Nakano et al. |
| 2003/0231334 | A1 | 12/2003 | Nagai |
| 2004/0078584 | A1* | 4/2004 | Moroney et al. .............. 713/189 |
| 2005/0033988 | A1 | 2/2005 | Chandrashekhar |
| 2005/0136979 | A1 | 6/2005 | Dietl et al. |
| 2005/0223162 | A1* | 10/2005 | Evans et al. .................... 711/111 |
| 2005/0244001 | A1 | 11/2005 | Kitani |
| 2005/0251695 | A1 | 11/2005 | Jaquette et al. ............... 713/194 |
| 2005/0254656 | A1 | 11/2005 | Rose et al. |
| 2006/0053282 | A1 | 3/2006 | McCown |
| 2006/0279773 | A1* | 12/2006 | Sakurai et al. ............... 358/1.15 |
| 2007/0113104 | A1* | 5/2007 | Witt et al. ..................... 713/193 |
| 2008/0063209 | A1 | 3/2008 | Jaquette et al. |
| 2009/0327746 | A1 | 12/2009 | Greco et al. |

FOREIGN PATENT DOCUMENTS

WO   WO2006066604   *  6/2006

OTHER PUBLICATIONS

"Draft Standard for Authenticated Encryption with Length Expansion for Storage Devices." Aug. 2007.
"HP Library Encryption—LTO4 Key Management API." 2006.
"Draft Minutes Encryption Key Management Study Group." Dec. 5, 2005.

* cited by examiner

Primary Examiner — Lisa Lewis
(74) Attorney, Agent, or Firm — Terrile, Cannatti, Chambers & Holland, LLP; Stephen A. Terrile

(57) ABSTRACT

A method, system and program are provided for enabling selective access to multiple users' encrypted data in a single storage cartridge. A unique, derived key is generated for each user's data by performing cryptographic operations on a combination of a common base key and metadata related to the data to be encrypted (e.g. its total block count). The base data key is wrapped with one or more encryption keys to form one or more encryption encapsulated data keys (EEDKs). The base key and the derived key are wrapped to create a session encrypted data key (SEDK), which along with the EEDKs, are conveyed to the tape drive, where the SEDK is decrypted. The EEDKs are then stored in one or more places on the storage cartridge. The base key and the derived key are used to encrypt a predetermined user's data, with the derived key stored on the cartridge with the encrypted data. The encrypted data may be subsequently decrypted by retrieving the EEDK and decrypting it with a decryption key to extract the base data key. The extracted base data key can then be used with other information to calculate the derived key. Once calculated, the derived key is used to decrypt its associated encrypted data.

30 Claims, 17 Drawing Sheets

USE OF INDIRECT DATA KEYS FOR ENCRYPTED TAPE CARTRIDGES

BACKGROUND OF THE INVENTION

1. Field of the Invention

The present invention relates to a method, system, and program for securely providing keys to encrypt and decrypt data in a storage cartridge.

2. Description of the Related Art

Protecting and securing data is a primary concern that must be addressed when designing information management systems, whether for a single user, small business, or for large corporations or government agencies. It is common for data to be continually archived on various storage media, such as tape cartridges or optical disks. When archiving data on tape or other removable storage medium, one security concern is that the tape will be lost or stolen and that someone will attempt to access the data it contains. Also, if the tape can be mounted into a tape drive through remote commands transmitted over a network, then there is a concern that someone may "hack" into the system, mount the tape or other storage medium in a drive, and then access the data.

Prior approaches to addressing these issues include encrypting all or most of the data on the storage media, but each of these have inherent drawbacks including security weaknesses, implementation challenges and/or unwieldy complexity. For example, conventional solutions that store encrypted data on a tape together with the data key used to encrypt the data in wrapped form allow anyone having physical access to the tape to retrieve the data key from the tape in wrapped form, and if they can unwrap the data key, use it to decrypt the data. Alternatively, data keys can be stored on the tape drive, but key management becomes complicated when using multiple tape drives, as each tape drive has to be able to store all keys that are in use by all tape cartridges in the tape storage library. Storing data keys on the tape drive also creates issues if the drive fails or is stolen. For example, if only one drive is in use and it fails, then the keys need to have been stored somewhere (e.g. on the tape cartridge or in a key manager) so they can be loaded into the replacement tape drive before the encrypted tape cartridges can be processed. If multiple tape drives are in use and one of them is stolen, it could be compromised and the keys it contains recovered, allowing all of the encrypted tape cartridges in the tape storage library to be read.

In addition, use of a single key to encrypt all of the data on one or more tape cartridges allows whoever has use of the key to decrypt all of the data comprising the tape cartridge, including data that doesn't belong to the user. Furthermore, use of a single encryption key does not allow a control entity to restrict a predetermined party's access to their data when it is commingled on a shared tape cartridge with encrypted data belonging to other parties. Conversely, using multiple keys for one or more cartridges can lead to a proliferation of keys as the number of authorized users, tape drives, and tape cartridges grows. Conventional encryption systems might also maintain the encryption and decryption keys external to the tape drive, and the management and transfer of large numbers of such encryption keys can cause significant performance degradation. Other data encryption approaches require special drive hardware to encrypt and decrypt tape data using an externally-stored encryption key (e.g. the key is stored on the host system and not the tape cartridge), creating other key management issues.

SUMMARY OF THE INVENTION

A method, system and program are disclosed for enabling tamper resistant, selective access to multiple users' encrypted data in a removable storage medium, such as single tape storage cartridge. In selected embodiments of the invention, a unique, derived key is generated for each user's data by performing cryptographic operations on a combination of a common base key and metadata related to the data to be encrypted (e.g. its total block count). The base data key is stored somewhere. It may be stored in an external key store or data base. It may be stored in a tape drive. Or it may be stored on the tape cartridge in encrypted (wrapped) form. If it is stored on the tape cartridge, the base data key is encrypted or wrapped with one or more key encrypting keys (e.g. a public key from a public/private key pair) and written to the cartridge to form one or more encryption encapsulated data keys (EEDKs).

On a write operation where a new base key is being created, a session encrypted data key (SEDK) and is sent to the drive, and one or more EEDKs may be sent to the drive as well. If sent, the EEDKs are then stored in one or more places on the storage cartridge. The base key, or a derived key, is encrypted in, and conveyed to, the tape drive within the SEDK, which is decrypted by the drive. If the base key was sent, then it is used by the drive to create a derived key. If a derived key was sent, then it is used directly. In either case, a derived key is used by the tape drive to encrypt a predetermined user's data, with the information necessary to create the derived key from the base key stored on the tape cartridge medium along with the encrypted data. In one embodiment, the encrypted data is subsequently decrypted by retrieving the EEDK and decrypting it with a decryption key (e.g. the private key from the public/private key pair) to extract the base data key. The extracted data key can then be used with other information to create, either by a key manager or the drive, the derived key. Once created, the derived key is used to decrypt the encrypted data associated with it. In other embodiments the base data key may be recalled from some key store or other form of storage external to the cartridge.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
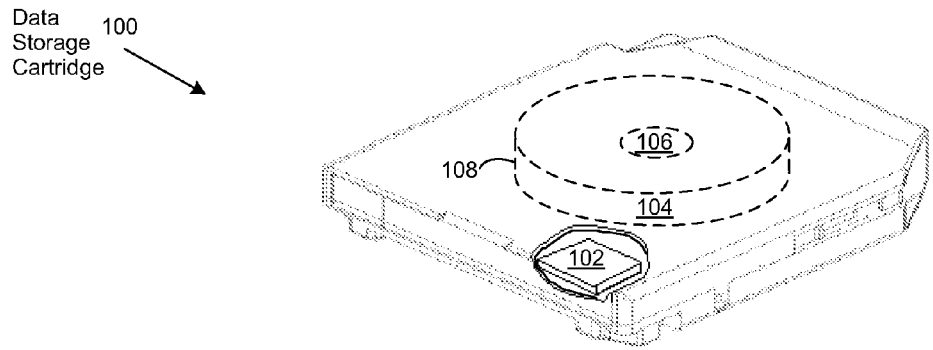
FIG. 1 illustrates a data storage cartridge with a cartridge memory and a tape medium.

A method, system and program are disclosed for enabling selective access to multiple users' encrypted data in a removable storage medium, such as single tape storage cartridge. In selected embodiments of the invention, a unique, derived key is generated for each user's data by performing cryptographic operations on a combination of a common base key and metadata related to the data to be encrypted (e.g. its total block count). The base data key may be stored external to the tape cartridge, and in some embodiments base data key storage may only be external to the tape cartridge and in other embodiments it might be stored both external to and on the tape cartridge. If it is not stored external to the tape cartridge, then it must be stored on the tape cartridge. To store the base data key on the cartridge, it must be encrypted or wrapped with one or more encryption keys (a.k.a. key encrypting keys) to form one or more encryption encapsulated data keys (EEDKs). In this case key material still must be stored external to the drive—to allow the EEDKs to be unwrapped. If an EEDK was wrapped with a key encrypting key which is a secret symmetric key, then this secret symmetric key must be stored external to the cartridge so the EEDKs can be unwrapped. If an EEDK was wrapped with a key encrypting key which is an asymmetric public key, then the corresponding asymmetric private key must be stored external to the cartridge so the EEDK can be unwrapped. Secret or private parts of key encrypting keys are typically stored in key stores. On a write operation where a new base key is being created, a session encrypted data key (SEDK) and is sent to the drive, and one or more EEDKs may be sent to the drive as well. If sent, the EEDKs are then stored in one or more places on the storage cartridge. The base key, or a derived key, is encrypted in the SEDK and conveyed to the tape drive, where it is decrypted by the drive. If the base key was sent, then it is used by the drive to create a derived key. If a derived key was sent, then it is used directly. In either case, a derived key is used by the tape drive to encrypt a predetermined user's data, with the information necessary to create the derived key from the base key stored on the tape cartridge medium along with the encrypted data. The encrypted data may be subsequently decrypted by retrieving the EEDK from the cartridge and decrypting it with a decryption key to extract the base data key. If the base data key was stored external to the cartridge (e.g. in a key store), then it may be recalled from that key store. The extracted or recalled data key can then be used with other information to create the derived key. Once created, the derived key is used to decrypt the encrypted data with which it is associated.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Referring to FIG. 1, a data storage cartridge 100 is illustrated which includes a non-volatile read/writable cartridge memory (CM) circuit 102 (shown in cutaway) and a rewritable storage media 108, such as a high capacity single reel of magnetic tape (shown in phantom) wound on a hub 106 of a reel 104. The cartridge memory 102 is a passive storage device that includes a transponder that provides a contactless interface, and is used to hold information about that specific cartridge, the medium in the cartridge, and the data on the medium. Examples of magnetic tape cartridges comprise a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the data storage cartridge 100 may be a magnetic tape cartridge having dual reel cartridges (in which the tape is fed between reels within the cartridge) or single reel cartridges, such as illustrated in FIG. 1, in which the media 108 is wound on a reel 104 within the cartridge 100. For example, when the data storage cartridge 100 is loaded, the tape is fed between the cartridge reel and a take up reel (not shown). While exemplary tape cartridges based on the LTO and 3592 formats have been described, it will be appreciated that the description is not limited by tape format. Examples of other tape formats include DLT, SDLT, 9840, 9940, T10000, AIT and the like. Additionally, while the description provided herein is with reference to magnetic tape cartridges, it will be appreciated that data storage cartridges may be implemented with magnetic tape, optical tape, optical disk, holographic disk, or magnetic disk, or other forms of rewritable storage media. Likewise, some tape formats do not include cartridge memories (e.g. 3590), while others have a cartridge memory requiring contact (e.g. AIT).

Figure 2:
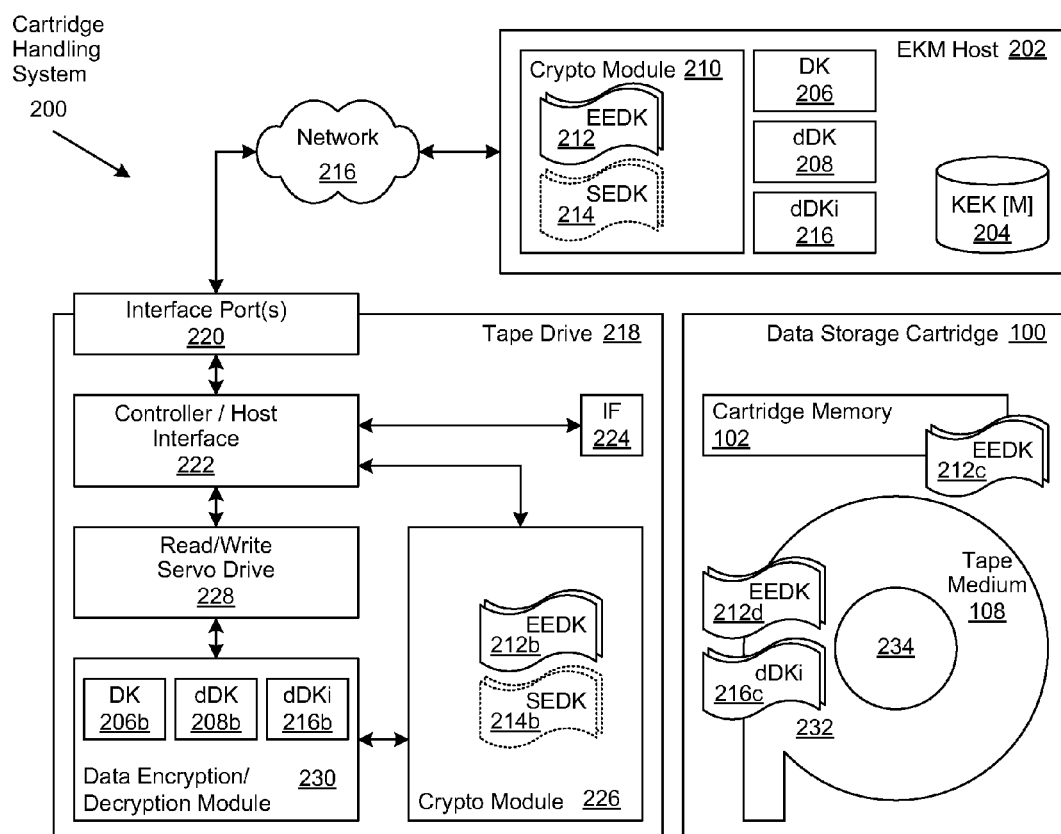
FIG. 2 is a generalized block diagram of a computing environment in which a tape cartridge and tape drive are implemented.

Referring to FIG. 2, a computing environment is illustrated in which a data storage cartridge 100 and tape drive 218 are implemented in combination with an encryption key manager (EKM)/Host 202 as a cartridge handling system 200. It will be appreciated that the EKM may be an application running on a host computer (acting alone or connecting to the drive via a proxy), a key management appliance (acting alone or connecting to the drive via a proxy), or the like. One example implementation of such a cartridge handling system 200 would be a magnetic tape data storage system formed from the combination of an IBM EKM, an IBM 3592 Model E05 Encrypting Tape Drive, and the IBM 3592 Enterprise Tape Cartridge subsystem.

When the EKM/Host 202 is an application running on a host computer (as illustrated), the host computer can be operable to run other applications (not shown), such as a backup program, that transfers data to the tape drive 218 to sequentially write to the data storage cartridge 100, such as by using the Small Computer System Interface (SCSI) tape commands to communicate I/O requests to the tape drive 218, or any other data access command protocol known in the art. As will be appreciated, the other applications could alternately be running on other servers (i.e. the EKM may reside on one server and any application which is reading and writing data to the drive may reside on another server). However implemented, the EKM/Host 202 includes a data key generation functionality for generating a data key (DK) 206 for use in performing data encryption, though this functionality may also be provided in the drive 218 or even externally to the system 200. The EKM/Host 202 may also include a data key generation functionality for generating a derived data key (dDK) 208 which is created from DK 206 by combining it cryptographically with other predetermined information to create an irreversible cryptographic transformation, such as an encryption operation, or a hashing operation. In addition, the EKM/Host 202 includes a key wrap crypto module 210 that is used to form a session encrypted data key (SEDK) 214 from the data key 206, and then to securely pass the SEDK 214 to the tape drive 218 as part of a secure key exchange. The key wrap crypto module 210 also securely encrypts the DK 206 to form one or more encryption encapsulated data keys (EEDK(s)) 212 (as indicated by the stacked keys). In various embodiments, the key wrap crypto module 210 may use a predetermined public key encryption technique (e.g. such as RSA or ECC), or a symmetric encryption technique (e.g. such as AES) to generate EEDK(s) 212 from DK(s) 206. For example, the public part of a public/private key pair that is retrieved from a key store 204 (which may or may not reside locally with EKM/Host 202) may be used to wrap the data key 206 into its encrypted EEDK form. The encrypted EEDK form includes not only the encrypted data key DK itself, but also other structural information, such as a key label or key hash, which identifies the public/private key pair that is used to wrap the data key 206. Once a public key from the key store 204 is used to generate an EEDK 212, the identifying structural information in the EEDK 212 can be later used by the key module 210 or EKM 202 as an index or reference to the public/private key pair in the key store 204 to retrieve the private key from the key store 204 when the EEDK 212 needs to be unwrapped to produce DK 206.

The tape drive 218 may connect with the host 202 through a direct interface (such as an SCSI, Fibre Channel (FCP), etc., in the case where the tape drive 218 is connected to the host 202) or may connect over a data channel or network 216 (such as a Local Area Network (LAN), Storage Area Network (SAN), Wide Area Network (WAN), the Internet, an Intranet, etc.). It will be appreciated that the tape drive 218 may be enclosed within the host system 202 or may be a standalone unit or in a tape library system (not shown), which may include one or more tape drives, one or more storage units to store multiple tape cartridges, and a mechanical system (commonly referred to as an accessor) to transfer the tape cartridges between the storage unit(s) and the tape drive(s). As illustrated, the tape drive 218 includes a memory circuit interface (IF) 224 for reading information from, and writing information to, the cartridge memory 102 of the data storage cartridge 100 in a contactless manner. In addition, a read/write servo drive system 228 is provided for reading information from, and writing information to, the rewritable storage media 108. The read/write servo drive system 228 controls the movement of a servo head (not shown) relative to the rewritable storage media 108 by moving the rewritable storage media 108 across the servo head at a desired velocity, and stops, starts and reverses the direction of movement of the magnetic tape.

A control system (or controller) 222 in the tape drive 218 communicates with the memory interface 224 and the read/write system servo drive 228. To receive commands and exchange information for operating the cartridge handling system 200, the controller 222 also acts as a host interface to communicate over one or more ports 220 with one or more encryption key management (EKM) subsystems 202 (such as a host computer, library or external key management appliance). In addition, a crypto module 226 and data encryption/decryption module 230 are provided in the tape drive 218 for securely encrypting and storing data to the data storage cartridge 100 and for securely retrieving and decrypting data stored on the data storage cartridge 100. In operation, the data encryption/decryption module 230 performs the actual data encryption and decryption (such as by using the Advanced Encryption Standard encryption algorithm) using a data key having any supported key length (e.g. 128 or 256-bit data key length), and may also perform other encoding functions, such as data compression and decompression and data buffering. The crypto module 226 controls the data encryption/decryption module 230 by securely exchanging data keys (DKs) 206$b$, or derived data keys (dDKs) 208$b$, using the session encrypted data key (SEDK) 214$b$ which is received from the EKM 202 (where it is originally generated as SEDK 214). At the crypto module 226, the DK 206$b$, or dDK 208$b$, is extracted from the SEDK 214$b$. If a DK 206$b$ was sent, the drive creates a derived key from the base Data Key and some reference data (e.g. the Total Block Count of the first block to be encrypted/decrypted) via cryptographic operations. A derived key, whether as received, or as created by the drive, is then sent to the data encryption/decryption module 230 where it is used to encrypt/decrypt the input data stream. The reference data used to create the dDK 208$b$ may also be copied to a predetermined location on tape medium 108 as dDKi 216$c$ if it is not readily determinable without any such explicit reference (e.g. as Total Block Count might be). In addition, the crypto module 226 assembles, validates, distributes, stores, and retrieves one or more associated encryption encapsulated data keys (EEDKs) 212$b$ (where the letter suffix "b" in the reference numeral indicates that the EEDKs 212 and 212$b$ are logically identical, though physically distinct, copies). While the modules 226, 230 may be implemented with any desired combination of hardware and/or software, the data encryption/decryption module 230 may be implemented with an ASIC or FPGA circuit, while the crypto module 226 may be implemented with one or more drive firmware modules that include a microprocessor and microcode stored in a code memory.

As described herein, the cartridge handling system 200 performs a variety of functions, including but not limited to, cryptographically deriving multiple data keys from a single known base data key and a plurality of other predetermined data elements; encrypting data to be stored on the cartridge 100 using a base data key (such as an AES encryption key) or one of its derived keys; using key wrap cryptography techniques to wrap the base data key, or one of the derived keys created from it, with a different key to form one or more encrypted data keys; writing and reading the encrypted data and encrypted data key(s) to and from the tape cartridge media; and unwrapping the encrypted base data key or one of its derived keys such that the unwrapped key can decrypt either all (in the case of the base data key) or only some (in the case of a derived data key) of the stored encrypted data. In this way, the cartridge handling system 200 provides a distributed key store which allows different user's data to be separately and uniquely encrypted onto, or decrypted from, a single tape cartridge 100.

For example, at least a first EEDK 212 is generated for local use by using a public key of the local key manager to wrap the data key 206, and the EEDK 212 is then transferred via the tape drive 218 (where it may be temporarily stored as 212b) for storage on the data storage cartridge 100 at one or more predetermined locations, as indicated at 212c and 212d. As a result, the transferred EEDK 212b may be stored in the cartridge memory 102 and/or one or more non-user data areas of the tape media 108, such as a read-in area 232 or an end of tape area 234. When EEDKs are used to store keys in wrapped form on a tape cartridge, only a single copy of the EEDK 210 is required to be stored on the data storage cartridge 100, but reliability and resiliency are enhanced by using one or more non-user areas 232, 234 of the tape 108 to store additional copies of the EEDK 212 such that N copies exist, thereby allowing operation to continue even if up to N−1 of the EEDKs 212, 212b are unrecoverable. Since the only non-volatile copies of the EEDKs are stored within the data storage cartridge 100, multiple copies of the EEDKs (212c, 212d, etc.) provide multiple ways to access the EEDKs and thus the data key 206 in the cases where one or more copies of the EEDKs cannot be read or otherwise processed due to errors or degraded media or drive conditions. In selected embodiments, the keys are not stored in the cartridge, but in another location such as a database.

When a plurality of EEDKs 212 are generated from a single data key 206 (or derived key 208), such as when a second EEDK is generated for a remote user (e.g. a business partner) by using a public key of the remote user to wrap the data key 206, the plurality of EEDKs 212 are transferred via the tape drive 218 for storage on the data storage cartridge 100 at one or more locations (as indicated by the copies of the EEDKs 212c and 212d that are stored in one or more non-user data areas 232, 234 of the tape media 108 and/or the cartridge memory 102). By storing multiple EEDKs on the data storage cartridge 100 in specially designated locations (such as the cartridge memory 102 or outside of the tape's user data area), the data storage cartridge 100 can have one EEDK wrapped for local use and another for remote exchange. Multiple EEDKs can also be used to store multiple keys, with one EEDK wrapping a base data key and a second EEDK wrapping a derived data key. If the EEDK wrapping the derived data key is wrapped with a business partner's public key, and that is the only EEDK the business partner can unwrap, then they are only being given access to a subset of the data on the cartridge. In theory, any number of different EEDKs could be stored, provided there is storage space for them.

Figure 3:
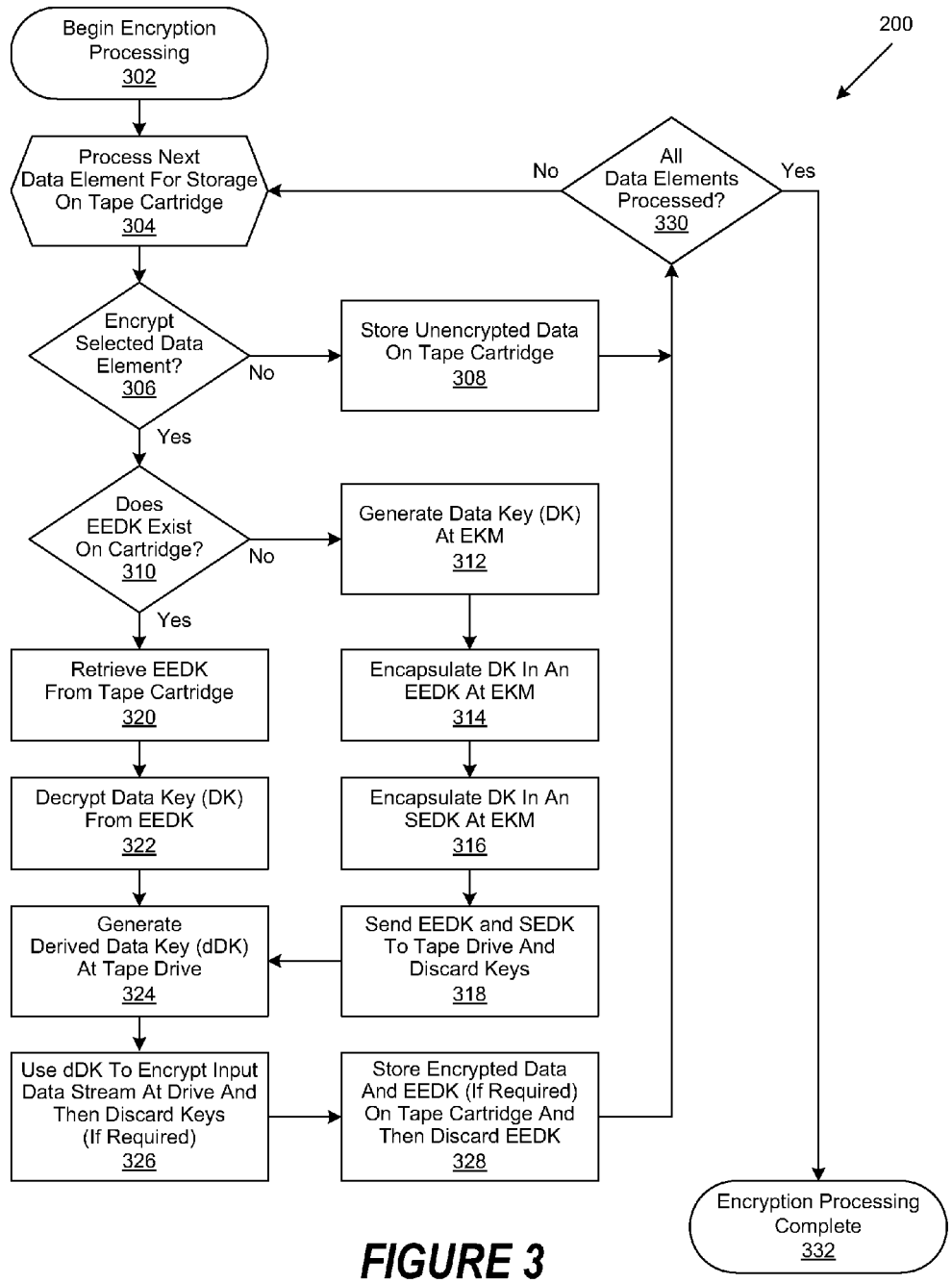
FIG. 3 is a logical flowchart of the steps used to encrypt and store data.

To illustrate how data may be securely encrypted and stored on a removable tape cartridge that has not previously acquired its own encrypted data keys, reference is now made to the process flow depicted in FIG. 3 and the cartridge handling system 200 depicted in FIG. 2. Encryption processing begins in step 302, starting with the processing of the next data element to be stored on the data storage cartridge 100 in step 304. If it is determined in step 306 that the selected data element is not to be encrypted, then the unencrypted data element is stored on the data storage cartridge 100 in step 308. If it is determined in step 330 that all data elements have been processed, then encryption processing operations are completed in step 332. Otherwise, the data encryption process then repeats itself, possibly on a new cartridge, or possibly on the same cartridge which has been reloaded, beginning with the next element to be processed in step 304. Otherwise, it is determined in step 310 whether a data key is stored as an EEDK on tape cartridge 100. If a data key is not stored as an EEDK on tape cartridge 100, then a DK 206 is generated at the EKM 202 in step 312 and is then made available in encrypted form to the tape drive 218 before the write process begins. To this end, a secure key exchange is used to transfer the DK 206 in encrypted form to the tape drive 218 for purposes of enabling the tape drive encryption process.

While a variety of different encryption techniques may be used, an initial key generation process at the EKM 202 encrypts the DK 206 to form one or more EEDKs 212 using an encryption method, such as a pubic key cryptographic method in step 314. It is unimportant whether the encryption method is known outside of the EKM 202. In a selected embodiment, the EEDK 212 creation process in the EKM 202 uses asymmetric encryption by performing RSA 2048-bit encryption of the DK 206 with the public part of a public/private key pair to render the data key 206 within the EEDK 212 very secure against any entity which does not possess the private part of the key pair, unless they can break the public/private algorithm itself. Those of skill in the art will be knowledgeable of the estimated number of calculations required to do this, which are very large, making it computationally infeasible). To associate the generated EEDK(s) 212 with the public/private key pair used to encrypt the DK 206, structural information about the public/private key pair is included in each generated EEDK 212 by the EKM 202 which can be extracted from the EEDK 212 for future access to the data key 206 and consequently the encrypted data itself.

At this time, a secure key exchange is established to encrypt the data key DK 206 with a session key (e.g., the public key from the tape drive 218), thereby generating a session encrypted data key (SEDK) 214 in step 316, which can be securely passed, along with the EEDK(s) 212, to the tape drive 218. In some embodiments, the SEDK also contains a derived data key index dDKi 216, which can be used with the data key DK 206 to generate a derived data key dDK. In other embodiments the dDKi 216 may be sent to the tape drive 218 separately. Once the EKM 202 sends the encrypted data keys to the tape drive 218 in step 318, the DK 206 and EEDKs 212, 214 may be discarded by the EKM 202. As will be appreciated, there are several methodologies which may be used for secure key exchanges, including wrapping the DK 206 in a session key, though other techniques may be used, including but not limited to RSA, Diffie-Hellman (DH), elliptic curve Diffie Hellman (ECDH), Digital Signature Algorithm (DSA), elliptic curve DSA (ECDSA), etc. The session key may be generated by the tape drive 218, by the host 202, or jointly (e.g. a Diffie-Hellman key negotiation).

Upon transfer to the tape drive 218, the EEDK(s) 212b and the SEDK 214b are stored in the crypto module 226. The tape drive 218 decrypts the SEDK 214b with its session key (which may be the private part of a public/private asymmetric key pair) to produce the DK 206b, which is used to set up the encryption hardware module 230 for generation of derived data key (dDK) 208b in step 324. In some embodiments, a copy of the derived data key index is copied to a predetermined location on tape media 108 as dDKi 216. At any point after the encryption hardware module 230 is set up, the SEDK 214b may be discarded from the tape drive 218 in step 318. The tape drive 218 also writes the EEDK(s) 212b to the data storage cartridge 100 as part of set up or any point thereafter, and begins encrypting data using a derived key in step 326. In one embodiment, the derived key is calculated from the extracted DK 206b and a dDKi (whether externally received or internally ascertained). In another embodiment, dDK 208b is set to be equal to the derived data key dDK 208 received from the EKM. When writing the EEDKs 212b to the data storage cartridge 100, the tape drive 218 stores multiple copies of the EEDK 212c-d in a plurality of locations, such as one or more non-user data areas 232, 234 of tape 108 and in the cartridge memory 102 in step 328. In selected embodiments, the EEDKs are written to the data storage cartridge 100 before the encoding or writing of data since such writing may comprise many gigabytes. Also, by recording the EEDKs 212c-d first, the host system that encounters an error condition can retrieve some portion of the written encrypted data by using the previously stored EEDK 212c-d for that encrypted data. While the EEDKs 212b could be discarded from the tape drive 218 after being written to the data storage cartridge 100, they may be retained in the tape drive 218 in a volatile fashion for as long as the cartridge is loaded in the drive. The dDk 208b is then used to encrypt the input data stream in step 326 and the tape drive 218 writes the encrypted data it has been instructed to write to the tape 108 in step 328. Completion of write operations is signaled to the drive via an Unload or other terminal command, at which time the tape drive 218 discards the DK 206b or the dDK 208b in step 328. Once the encrypted data and EEDK(s) 212c-d are stored to the data storage cartridge 100, the tape drive 218 discards the encrypted data and the EEDK(s) 212b in step 328. If it is determined in step 330 that all data elements have been processed, then encryption processing operations are completed in step 332. Otherwise, the data encryption process then repeats itself, possibly on a new cartridge, or possibly on the same cartridge which has been reloaded, beginning with the next element to be processed in step 304.

If it is determined in step 310 that a data key is stored as an EEDK on tape cartridge 100, then the EEDK is retrieved from the data storage cartridge 100 in step 320. Decryption operations as described in greater detail herein are then performed by the data encryption/decryption module 230 in step 322 to extract the data key. Once extracted, the DK 206b is used to set up the encryption hardware module 230 for generation of derived data key (dDK) 208b in step 324. The dDk 208b is then used to encrypt the input data stream in step 326 and the tape drive 218 writes the encrypted data it has been instructed to write to the tape 108 in step 328. Completion of write operations is signaled to the drive via an Unload or other terminal command, at which time the tape drive 218 discards the DK 206b or the dDK 208b in step 328. Since the EEDK is already present on tape cartridge 100, the EEDK is not written to the data storage cartridge 100 and it is discarded in step 328. If it is determined in step 330 that all data elements have been processed, then encryption processing operations are completed in step 332. Otherwise, the data encryption process then repeats itself, possibly on a new cartridge, or possibly on the same cartridge which has been reloaded, beginning with the next element to be processed in step 304.

Figure 4:
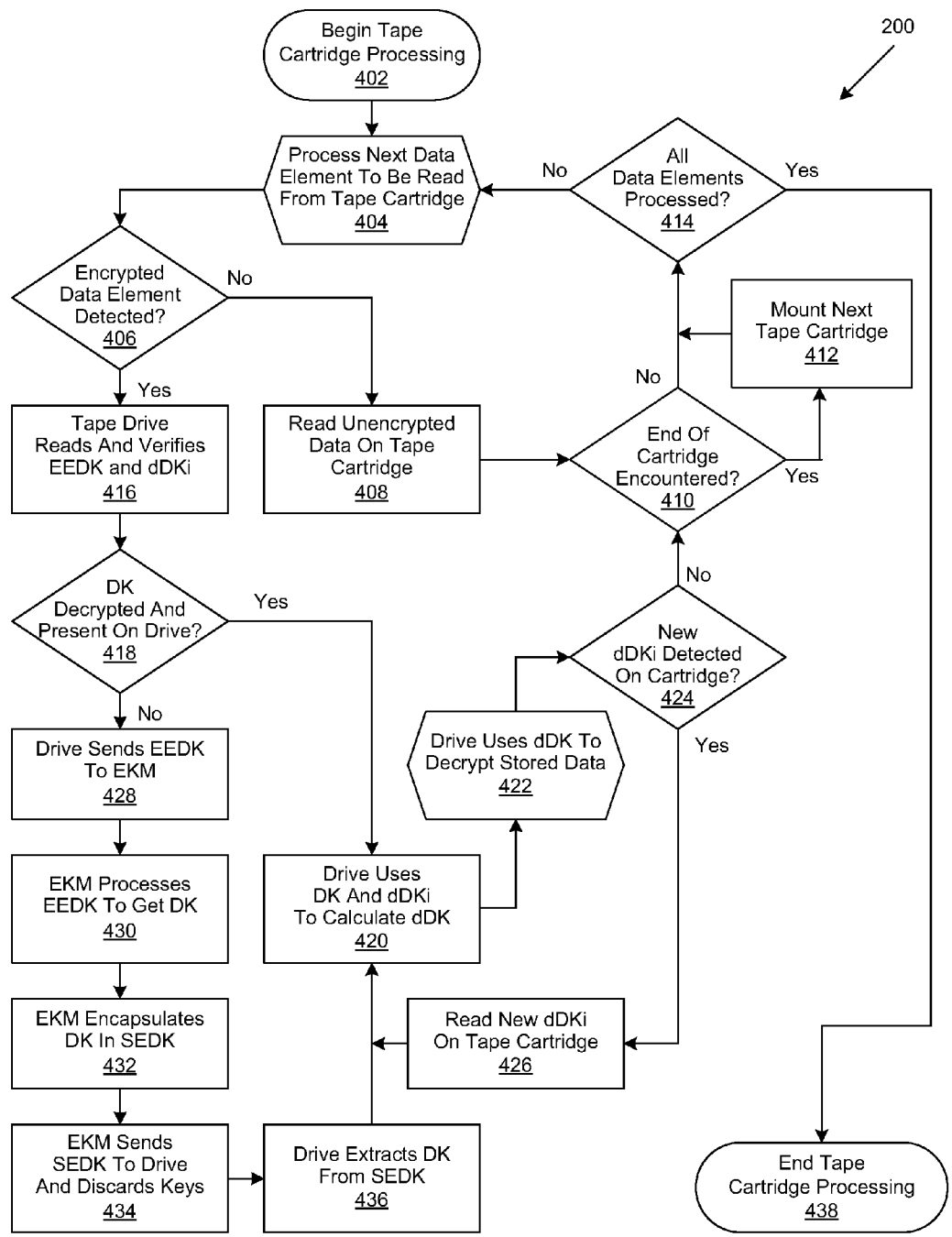
FIG. 4 is a logical flowchart of the steps used to read and decrypt stored data.

An example of how data may be securely decrypted when it is encountered during read operations on a removable tape cartridge will now be described with reference to the process flow 400 depicted in FIG. 4 and the cartridge handling system 200 depicted in FIG. 2. Tape cartridge processing begins in step 402, starting with the next data element to be read from the data storage cartridge 100 in step 404. If it is determined in step 406 that the selected element is not encrypted, then the unencrypted data element on the data storage cartridge 100 is read in step 408. If it is determined in step 410 that the end of the data storage cartridge 100 has been encountered, then the next tape cartridge is mounted in step 412. Otherwise it is determined in step 414 whether all data elements on the data storage cartridge 100 have been processed. If they have, then tape cartridge processing ends in step 438. Otherwise, the process is repeated beginning with the next data element to be processed in step 404. During the tape cartridge load process, the tape drive 218 may determine that a tape 108 has encryption data on it by detecting the existence of EEDKs 210 or other control indicators on the data storage cartridge 100. In one embodiment, this determination is determined by the tape drive 218 reading the EEDK(s) 212c from cartridge memory 102, reading and verifying the EEDK(s) 212d from a non-user data area(s) 232, 234, and/or reading dDKi 216c in a data area of tape 108. If it is determined in step 406 that an encrypted data element has been detected, then the tape drive 218 reads and verifies the EEDK(s) 212c-d and the dDKi 216c.

To enable the tape device hardware decryption and/or encryption process(es), a key exchange must occur in order to retrieve and decrypt the stored EEDKs 212c-d for purposes of extracting the correct decryption data key. However, if it is determined in step 418 that the data keys are not retained or stored on the tape drive 218, the EEDKs 212c-d must be used to reacquire the data key 206 at the EKM 202. For example, after the data storage cartridge 100 is loaded and the EEDKs 212c-d are stored as EEDKs 212b in the crypto module 226 of the tape drive 218, the tape drive 218 sends the EEDKs 212b to the EKM 202 in step 428. In one embodiment, this transfer occurs in response to a request from the EKM 202. In another embodiment, this transfer occurs automatically when a tape management library of an appliance is implemented. Once the EEDKs 212b are transferred to the EKM 202, the EKM 202 determines their validity and decrypts the EEDKs 212 by extracting structural information from each EEDK 212 and searching the key store 204 for a match, in which case the associated private key is output from the key store 204 and used to decrypt the EEDK 212, thereby extracting the data key DK 206 in step 430. The data key DK 206 and dDKi 216 are then securely wrapped in the tape drive's session key to generate the session encrypted data key SEDK 214 in step 432. Using any desired secure key exchange protocol, the EKM 202 passes the SEDK 214 to the tape drive 218 where it is stored as the SEDK 214b, at which time the EKM 202 discards the SEDK 214 in step 434. The tape drive 218 then decrypts the SEDK 214b with its private session key to produce the DK 206b and the dDKi 216b, which are used to set up the decryption hardware module 230 in step 436. The tape drive 218 can discard the SEDK 212b at any point after the decryption hardware module 230 is set up, even before the stored data is decrypted. Continuing in step 420, the decryption hardware module 230 uses the decrypted data key 206b and the dDKi 216*b* to generate the derived data key (dDK) 208*b*. Once the dDK 208*b* is generated it is used to decrypt the encrypted data element from the data storage cartridge 100 in step 422. If it is determined in step 424 that a new dDKi is encountered on the data storage cartridge 100, then the new dDKi is read from the data storage cartridge 100 in step 426 and the process repeats, beginning with step 420. If it determined in step 424 that no new dDKi is detected on the data storage cartridge 100, it is then determined in step 410 whether the end of the data storage cartridge 100 has been encountered. If it has, then the next tape cartridge is mounted in step 412. Otherwise, it is determined in step 414 whether all data elements on the data storage cartridge 100 have been processed. If they have not, then the process repeats, beginning with the next data element to be processed in step 404. Otherwise, tape cartridge processing ends in step 438.

However, if it is determined in step 418 that the data keys are retained or stored on the tape drive 218, then the decryption hardware module 230 uses the stored data key 206*b* and the dDKi 216*b* to generate the derived data key (dDK) 208*b*. Once the dDK 208*b* is generated it is used to decrypt the encrypted data element from the data storage cartridge 100 in step 422. If it is determined in step 424 that a new dDKi is encountered on the data storage cartridge 100, then the new dDKi is read from the data storage cartridge 100 in step 426 and the process repeats, beginning with step 420. If it determined in step 424 that no new dDKi is detected on the data storage cartridge 100, it is then determined in step 410 whether the end of the data storage cartridge 100 has been encountered. If it has, then the next tape cartridge is mounted in step 412. Otherwise, it is determined in step 414 whether all data elements on the data storage cartridge 100 have been processed. If they have not, then the process repeats, beginning with the next data element to be processed in step 404. Otherwise, tape cartridge processing ends in step 438.

Figure 5A:
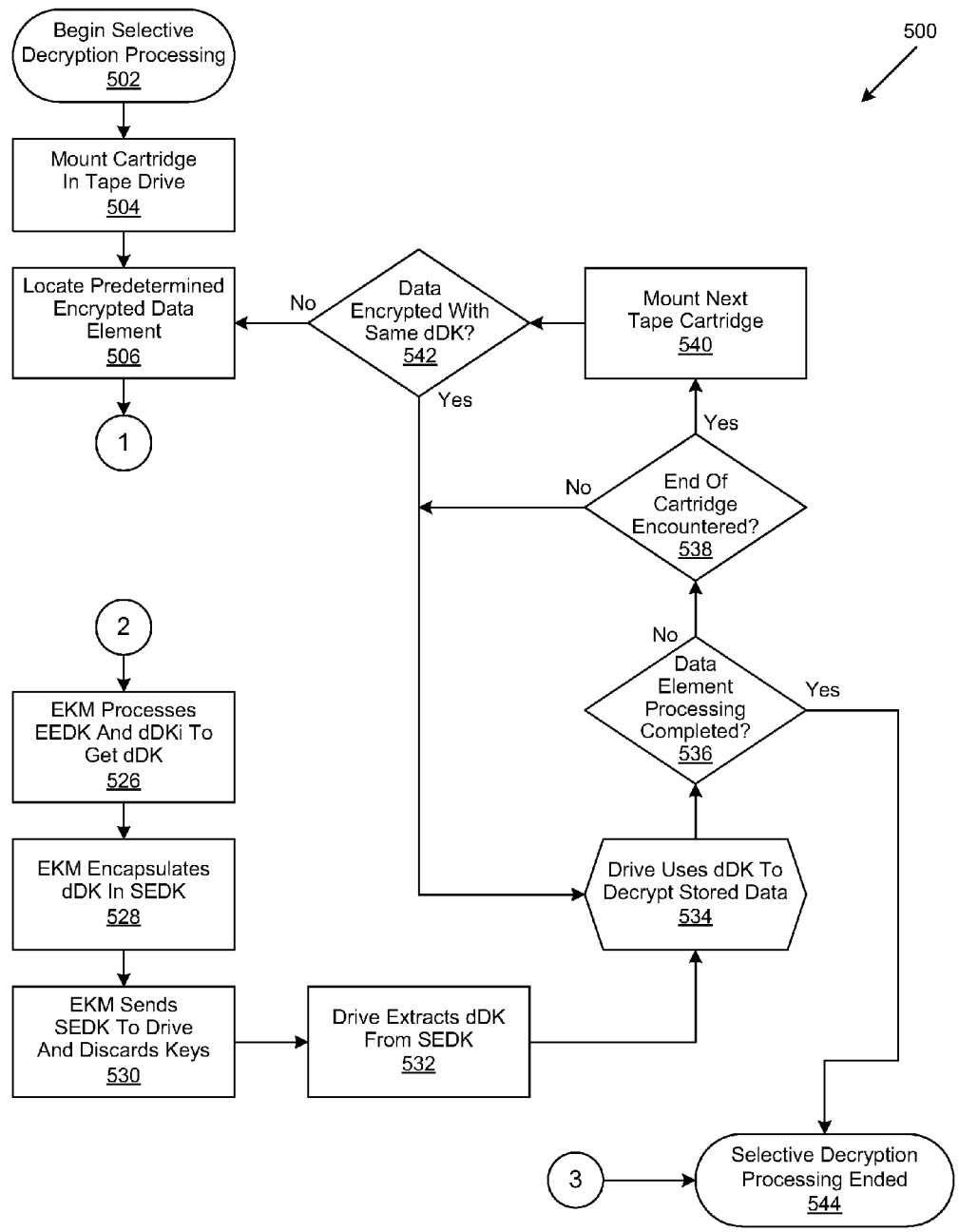
FIGS. 5a and 5b, generally referred to as FIG. 5, are a logical flowcharts of the steps used to securely decrypted during read operations on a removable tape cartridge.
Figure 5B:
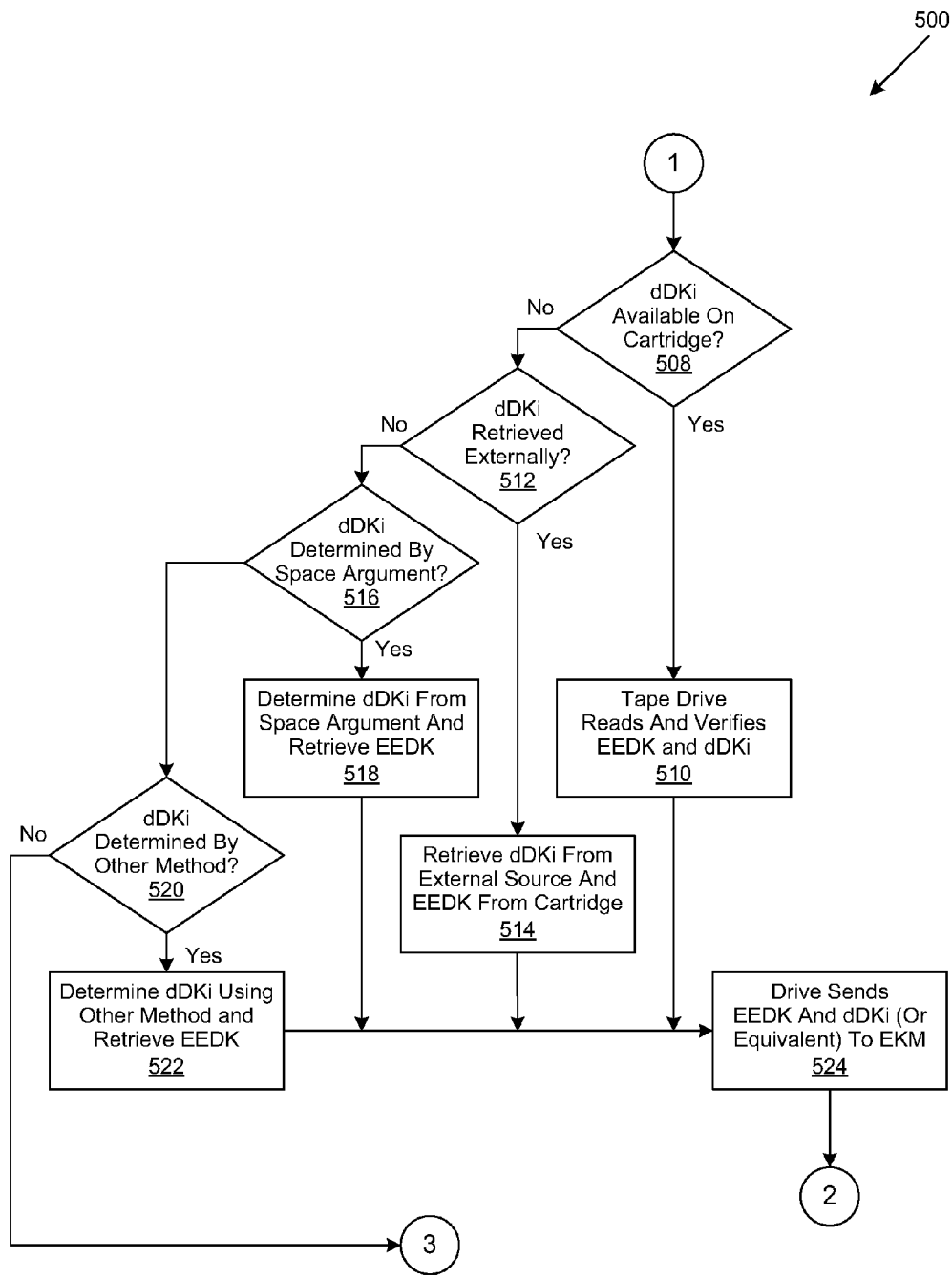

An example of how a predetermined data element may be securely decrypted during read operations on a removable tape cartridge will now be described with reference to the process flow 500 depicted in FIGS. 5*a-b* and the cartridge handling system 200 depicted in FIG. 2. Selective decryption processing of predetermined data elements begins in step 402, starting with the mounting in step 504 of a predetermined tape cartridge 100 in a tape drive 218. Once mounted, the predetermined data element to be decrypted is located in step 506. If it is determined in step 508 that the dDKi 216*c* associated with the predetermined data element to be decrypted is present on the tape 108, then the tape drive 218 reads and verifies the EEDK(s) 212*c-d* and the dDKi 216*c* from tape 108 in step 510. Once read, the tape drive 218 sends the EEDKs 212*b* to the EKM 202 in step 524. In one embodiment, this transfer occurs in response to a request from the EKM 202. In another embodiment, this transfer occurs automatically when a tape management library of an appliance is implemented. Once the EEDKs 212*b* are transferred to the EKM 202, the EKM 202 determines their validity and decrypts the EEDKs 212 by extracting structural information from each EEDK 212 and searching the key store 204 for a match. If a match is found, the associated private key is output from the key store 204 and used to decrypt the EEDK 212. Decryption of the EEDK results in extraction of the data key DK 206, which is used with the dDKi 216*b* in step 526 to generate the derived data key (dDK) 208.

The derived data key dDK 216 is then securely wrapped in the tape drive's session key to generate the session encrypted data key SEDK 214 in step 528. Using any desired secure key exchange protocol, the EKM 202 passes the SEDK 214 to the tape drive 218 where it is stored as the SEDK 214*b*, at which time the EKM 202 discards the SEDK 214 in step 530. The tape drive 218 then decrypts the SEDK 214*b* with its private session key to produce the dDK 208*b*, which is used to set up the decryption hardware module 230 in step 532. The tape drive 218 can discard the SEDK 212*b* at any point after the decryption hardware module 230 is set up, even before the stored data is decrypted. Continuing in step 534, the dDK 208*b* is used to decrypt the predetermined data element from the tape 108.

If it is determined in step 536 that processing to decrypt the predetermined data element has been completed, then selective decryption processing operations end in step 544. Otherwise, it is determined in step 538 whether the end of the data storage cartridge 100 has been encountered. If the end of the data storage cartridge 100 has not been encountered, then the dDK 208*b* continues to be used to decrypt the predetermined data element beginning in step 534. If it has, then the next tape cartridge is mounted in step 540 and it is then determined in step 542 whether the predetermined data element on the new tape cartridge 100 is encrypted with the same dDK 208*b* as the previous tape cartridge 100. If it is, then the dDK 208*b* continues to be used to decrypt the predetermined data element beginning in step 534. Otherwise, the process repeats, beginning with step 506.

However, if it is determined in step 512 that the dDKi 216*c* is not present on the tape 108, then it is determined in step 512 whether the dDKi 216*c* is to be retrieved from a source external to the tape drive 218. For example, a Tape Management System (not illustrated) that keeps track of which user's data is on which tape cartridge 100 could record the offset (e.g. total block count) of the user's data on a predetermined cartridge. Likewise, the external application could also store the dDKi associated with the data encrypted on the predetermined tape cartridge 100. In one embodiment, the tape drive 218 retrieves the dDKi from the external application and the EEDK 212*c-d* from the data storage cartridge 100 in step 514. The tape drive 218 then conveys the retrieved dDKi and EEDK 212*c-d* to the EKM 202 in step 524. In one embodiment, this transfer occurs in response to a request from the EKM 202. In another embodiment, this transfer occurs automatically when a tape management library or an appliance is implemented. Once the EEDKs 212*b* are transferred to the EKM 202, the EKM 202 determines their validity and decrypts the EEDKs 212 by extracting structural information from each EEDK 212 and searching the key store 204 for a match. If a match is found, the associated private key is output from the key store 204 and used to decrypt the EEDK 212. Decryption of the EEDK results in extraction of the data key DK 206, which is used with the dDKi 216*b* in step 526 to generate the derived data key (dDK) 208.

The derived data key dDK 216 is then securely wrapped in the tape drive's session key to generate the session encrypted data key SEDK 214 in step 528. Using any desired secure key exchange protocol, the EKM 202 passes the SEDK 214 to the tape drive 218 where it is stored as the SEDK 214*b*, at which time the EKM 202 discards the SEDK 214 in step 530. The tape drive 218 then decrypts the SEDK 214*b* with its private session key to produce the dDK 208*b*, which is used to set up the decryption hardware module 230 in step 532. The tape drive 218 can discard the SEDK 212*b* at any point after the decryption hardware module 230 is set up, even before the stored data is decrypted. Continuing in step 534, the dDK 208*b* is used to decrypt the predetermined data element from the tape 108.

If it is determined in step 536 that processing to decrypt the predetermined data element has been completed, then selective decryption processing operations end in step 544. Otherwise, it is determined in step 538 whether the end of the data storage cartridge 100 has been encountered. If the end of the data storage cartridge 100 has not been encountered, then the dDK 208*b* continues to be used to decrypt the predetermined data element beginning in step 534. If it has, then the next tape cartridge is mounted in step 540 and it is then determined in step 542 whether the predetermined data element on the new tape cartridge 100 is encrypted with the same dDK 208*b* as the previous tape cartridge 100. If it is, then the dDK 208*b* continues to be used to decrypt the predetermined data element beginning in step 534. Otherwise, the process repeats, beginning with step 506.

If, however, it is determined in step 512 that the dDKi 216*c* not to be retrieved externally, then it is determined in step 516 whether the dDKi 216*c* is the argument used to by the tape drive 218 to space or locate to the predetermined data element on the tape 100. If the argument s to be used, the drive 218 determines when the initial space or locate operation is made in step 518. The tape drive 218 then provides the information along with the retrieved EEDK 212*c-d* to the EKM 202 in step 524. In one embodiment, this transfer occurs in response to a request from the EKM 202. In another embodiment, this transfer occurs automatically when a tape management library or an appliance is implemented. Once the EEDKs 212*b* are transferred to the EKM 202, the EKM 202 determines their validity and decrypts the EEDKs 212 by extracting structural information from each EEDK 212 and searching the key store 204 for a match. If a match is found, the associated private key is output from the key store 204 and used to decrypt the EEDK 212. Decryption of the EEDK results in extraction of the data key DK 206, which is used with the dDKi 216*b* in step 526 to generate the derived data key (dDK) 208.

The derived data key dDK 216 is then securely wrapped in the tape drive's session key to generate the session encrypted data key SEDK 214 in step 528. Using any desired secure key exchange protocol, the EKM 202 passes the SEDK 214 to the tape drive 218 where it is stored as the SEDK 214*b*, at which time the EKM 202 discards the SEDK 214 in step 530. The tape drive 218 then decrypts the SEDK 214*b* with its private session key to produce the dDK 208*b*, which is used to set up the decryption hardware module 230 in step 532. The tape drive 218 can discard the SEDK 212*b* at any point after the decryption hardware module 230 is set up, even before the stored data is decrypted. Continuing in step 534, the dDK 208*b* is used to decrypt the predetermined data element from the tape 108.

If it is determined in step 536 that processing to decrypt the predetermined data element has been completed, then selective decryption processing operations end in step 544. Otherwise, it is determined in step 538 whether the end of the data storage cartridge 100 has been encountered. If the end of the data storage cartridge 100 has not been encountered, then the dDK 208*b* continues to be used to decrypt the predetermined data element beginning in step 534. If it has, then the next tape cartridge is mounted in step 540 and it is then determined in step 542 whether the predetermined data element on the new tape cartridge 100 is encrypted with the same dDK 208*b* as the previous tape cartridge 100. If it is, then the dDK 208*b* continues to be used to decrypt the predetermined data element beginning in step 534. Otherwise, the process repeats, beginning with step 506.

However, if it is determined in step 516 to not use the argument used by the tape drive 218 to space or locate to the predetermined data element on the tape 100, then it is determined in step 520 whether the dDKi 216*c* or its equivalent information is determined by an alternative method in step 522. If an alternative method is to be used, the tape drive 218 then provides the dDKi 216*c* or its equivalent information generated by the alternative method along with the retrieved EEDK 212*c-d* to the EKM 202 in step 524. In this embodiment, the transfer occurs in response to a request from the EKM 202. In another embodiment, this transfer occurs automatically when a tape management library or an appliance is implemented. Once the EEDKs 212*b* are transferred to the EKM 202, the EKM 202 determines their validity and decrypts the EEDKs 212 by extracting structural information from each EEDK 212 and searching the key store 204 for a match. If a match is found, the associated private key is output from the key store 204 and used to decrypt the EEDK 212. Decryption of the EEDK results in extraction of the data key DK 206, which is used with the dDKi 216*b* in step 526 to generate the derived data key (dDK) 208.

The derived data key dDK 216 is then securely wrapped in the tape drive's session key to generate the session encrypted data key SEDK 214 in step 528. Using any desired secure key exchange protocol, the EKM 202 passes the SEDK 214 to the tape drive 218 where it is stored as the SEDK 214*b*, at which time the EKM 202 discards the SEDK 214 in step 530. The tape drive 218 then decrypts the SEDK 214*b* with its private session key to produce the dDK 208*b*, which is used to set up the decryption hardware module 230 in step 532. The tape drive 218 can discard the SEDK 212*b* at any point after the decryption hardware module 230 is set up, even before the stored data is decrypted. Continuing in step 534, the dDK 208*b* is used to decrypt the predetermined data element from the tape 108.

If it is determined in step 536 that processing to decrypt the predetermined data element has been completed, then selective decryption processing operations end in step 544. Otherwise, it is determined in step 538 whether the end of the data storage cartridge 100 has been encountered. If the end of the data storage cartridge 100 has not been encountered, then the dDK 208*b* continues to be used to decrypt the predetermined data element beginning in step 534. If it has, then the next tape cartridge is mounted in step 540 and it is then determined in step 542 whether the predetermined data element on the new tape cartridge 100 is encrypted with the same dDK 208*b* as the previous tape cartridge 100. If it is, then the dDK 208*b* continues to be used to decrypt the predetermined data element beginning in step 534. Otherwise, the process repeats, beginning with step 506. Otherwise, selective decryption processing operations end in step 544.

Figure 6:
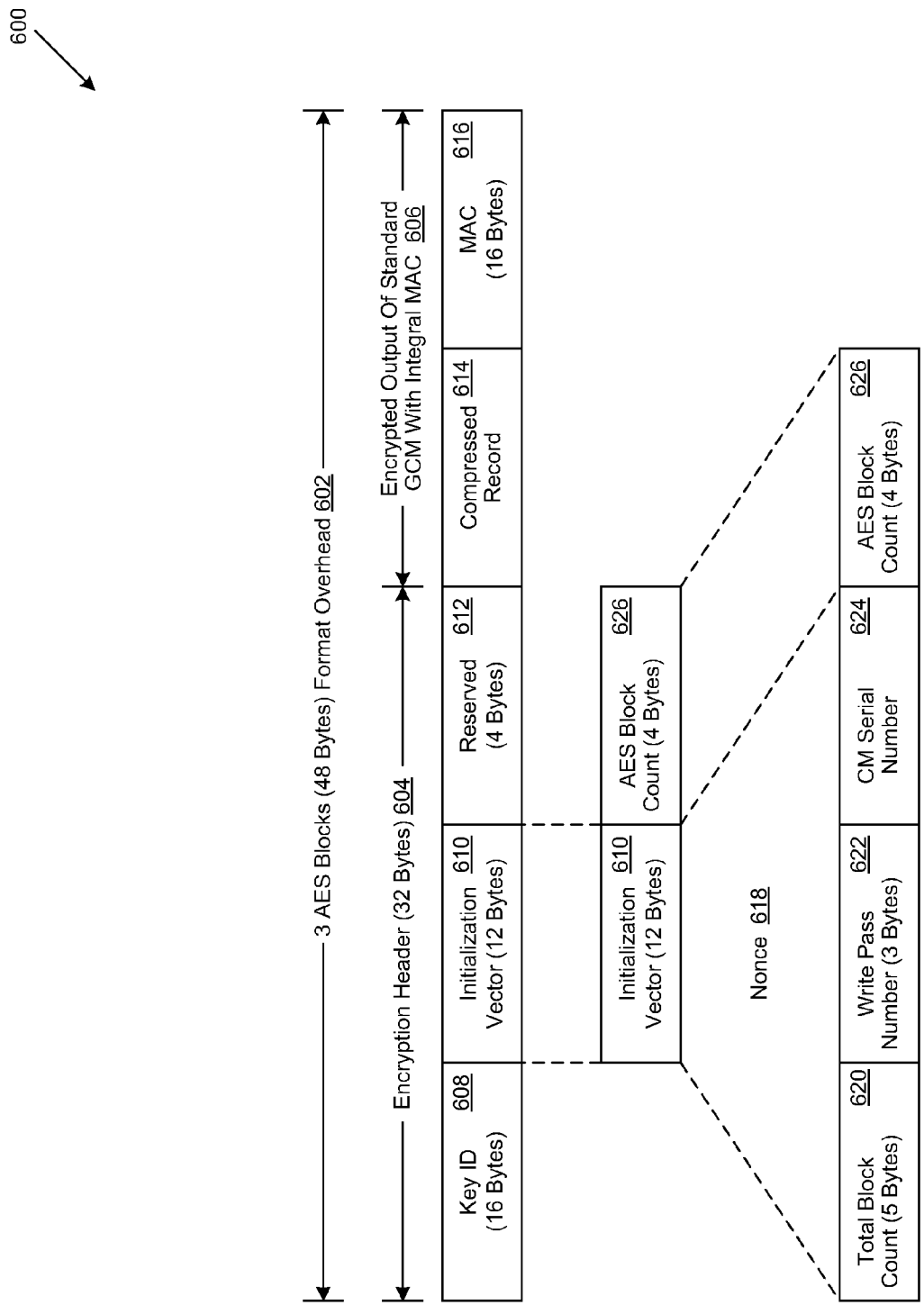
FIG. 6 illustrates a tape format used to store encrypted data.

Referring to FIG. 6, an encrypted tape format 600 is shown as implemented in accordance with an embodiment of the invention. Encrypted tape format 600 comprises three Advanced Encryption Standard (AES) blocks (48 bytes total) of format overhead 602, which further comprises 32 byte encryption header 604 and the resulting encrypted data output 606. Encryption header 604 comprises a 16 byte key ID field 608, a 12 byte initialization vector field 610 and a reserved block field 612 of 4 bytes. Encrypted data output 606 comprises a compressed data record 614, encrypted using Galois Counter Mode (GCM) block cipher operations, which is appended by a 16 byte Message Authentication Code (MAC) 616.

When implemented in accordance with Linear Tape Open (LTO) or IEEE's P1619.1, encrypted tape format 600 uses 4 bytes of the 16 byte KeyID field 608 for flags, leaving the remaining 12 bytes for storage of a 96 bit KeyID. In other implementations, the full 16 bytes are used to provide storage of a 128 bit KeyID. It will be apparent to those of skill in the art that implementation of encrypted tape format 600 allows each record on a tape cartridge to be written with a different data key and that implementation of even a 96 bit KeyID enables the use of a unique KeyID for each record. It will likewise be apparent that using KeyIDs to track Data Keys in a cartridge generally requires the use of an Encryption Key Manager (EKM) to keep each Data Key associated with its corresponding unique key index (KeyID). For example, a 256 bit key, which is 32 bytes long, in addition to the 12-16 byte KeyID, would result in each row associated with a tape cartridge being 44-48 bytes longer. When added to row lengths of 128 bytes or more, the storing of potentially tens-of-millions of these unique record keys would consume appreciable storage space on the tape cartridge. However, the frequent transferal of new base Data Keys to the tape drive (e.g., every record or every few records) would adversely affect performance.

In an embodiment of the invention, unique data keys are derived from a predetermined data key (DK) by performing a cryptographic operation on a combination of the predetermined DK and other information, such as an index. One example of such an index would be the total block count (TBC) of a file that is to be encrypted. For example:

$dDK_0 = E(DK, TBC_0)$
$dDK_1 = E(DK, TBC_1)$
. . .

where each Derived Data Key (dDK) is generated by encrypting (e.g. with AES data encryption) the associated Total Block Count (TBC) with the base Data Key (DK). Those of skill in the art will appreciate that the calculation could be any irreversible, but repeatable, cryptographic transformation. In particular, a cryptographic hash could also be used.

In this embodiment, the EKM only needs to issue a single data key, the base DK, to the tape drive, and it is the only data key that needs to be stored to tape, in wrapped form, as an EEDK. On full access read operations for decryption, the EKM decrypts the EEDK stored on the tape cartridge to retrieve the DK it contains and sends it back to the tape drive, generally wrapped in an SEDK for security. With the retrieved DK, full access to the tape cartridge is provided. For limited access read operations for decryption, the EKM first determines the TBC for the target file to be decrypted from information provided by the drive. Then the EKM decrypts the EEDK on the tape cartridge to retrieve the DK it contains. The EK then performs cryptographic operations on the retrieved DK and the $TBC_x$ to generate $DK_x$, which is used to decrypt the target file, starting at position $TBC_x$. In this case, the $TBC_x$ necessary for the calculation is provided to EKM either by the host application (which retains it) or by the drive (which may determine $TBC_x$ by the Space or Locate commands, or by reading the KeyID field associated with the Record to be read).

In another embodiment of the invention, a 12 byte KeyID 608 is generated by performing a cryptographic operation where:

12 byte Key*ID*=4 byte *rDKi*∥4 byte CartCnt∥4 byte dDKcnt where the rDKi is the index of a predetermined root data key in the Key Store, CartCnt is the number of tape cartridges which were served keys based on the predetermined root data key, and dDKcnt is the count of derived keys within the target tape cartridge. It will be apparent to those of skill in the art that with each field being 4 bytes (32 bits) in length, that there are 4 billion possibilities to each field. In selected embodiments, relatively few root keys are required, beginning with a single root key. From a single root key, unique keys could be derived for up to 4 billion tape cartridges, each of which could have up to 4 billion unique keys. Once the initial root key expired, an additional 4 billion keys could be generated with the next root key. In other embodiments, other types of keys and predetermined information are used in the 4 byte fields to generate unique, derived data keys.

In selected embodiments, Initialization Vector (IV) 610 comprises a block of 16 bytes used as a nonce 618. Those of skill in the art will be familiar with the use of a nonce 618, which is a number that is used only once with a predetermined key to provide the starting value of a counter comprising a block mode cipher such as GCM. Use of the same counter value the same predetermined key to create two or more cipher texts can result in nonce collisions, which are a possibility when all of the tape cartridges used in a system are encrypted using the same key. In an embodiment of the invention, IV 610 is implemented as a nonce 618 comprised of the total block count 620, the write pass number 622, and the cartridge memory (CM) serial number 624. In an embodiment of the invention, reserved field 612 of encryption header 604 is implemented to comprise the AES block count 626.

Figure 7:
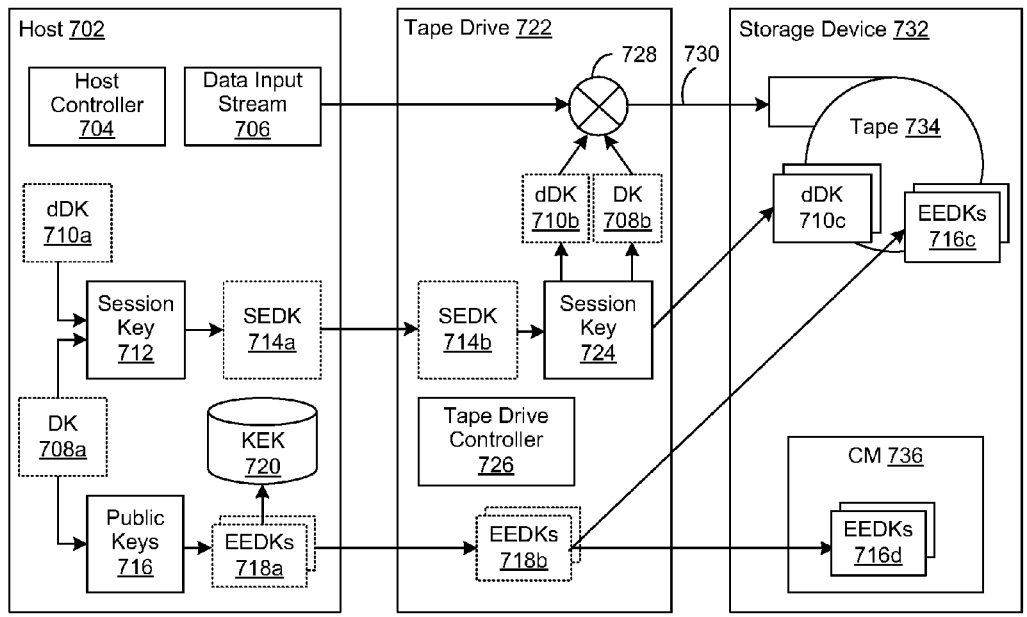
FIG. 7 illustrates a key storage architecture for storing encrypted data.

FIG. 7 shows a key storage architecture for storing encrypted data to illustrate how the various keys may be deployed in the host 702, tape drive 722 and storage device 732. The host 702 generates a unique data key (DK) 708a (e.g. a unique 256-bit AES key) and derived data key (dDK) 610a to encrypt and decrypt data on at least one storage device. The host 602 also includes a session key 712 that is capable of encrypting data that can be decrypted by a session key 724 at the tape drive 722. For example, the session keys 712, 724 can be generated as a public/private key pair using public key encryption algorithms known in the art. The host 702 further includes one or more public keys 716 that are capable of encrypting the data key 708a into one or more encryption encapsulated data keys (EEDKs) 718a that can be decrypted by the appropriate private key that matches the public key 716. To subsequently extract a data key from the EEDK 718a (upon its subsequent receipt), the generated EEDK 718a includes meta information (such as key label or identifier information relating to the key encrypting key 720) that can be used to reference or lookup the key encrypting key 720 and its corresponding private key in the key store 720 that can be used to decrypt the received EEDK. In addition or in the alternative, the key store 720 stores information identifying the EEDKs generated by the host 702 so that the identifying information is associated (e.g. by using a table) with the public key used by the host to generate the EEDK. Finally, the host 702 includes a host controller 704 that handles I/O requests for directing a data input stream 706 to the tape drive 722. Once the DK 708a, dDK 210a, and encrypted data keys 714a, 718a are used, they may be discarded from the host 702, as indicated by the dashed lines in FIG. 7.

At the tape drive 722, the received SEDK 714b is stored and decrypted by the session key 724 to generate a local copy of the DK 708b and the dDK 710b, all under control of the tape drive controller 726. The DK 708b and dDk 710b is then combined in an encryption circuit 726 with the input data stream 706 from the host 702, thereby generating an encrypted data stream 730 that is stored in the tape media 734. In addition, the received EEDKs 718b are forwarded to the storage device 732 where they are collectively stored to one or more locations 718c in the non-user data portion of the tape 734, and to predetermined location(s) 718d in the cartridge memory 736. Decrypted dDK 710b is similarly copied as dDK 710c to a predetermined data location on tape 734 as part of the encrypted data stream written to tape 734. Once the DK 708b, dDK 210b, and encrypted data keys 714b, 718b are processed at the tape drive 722, they may be discarded, as indicated by the dashed lines.

Figure 8:
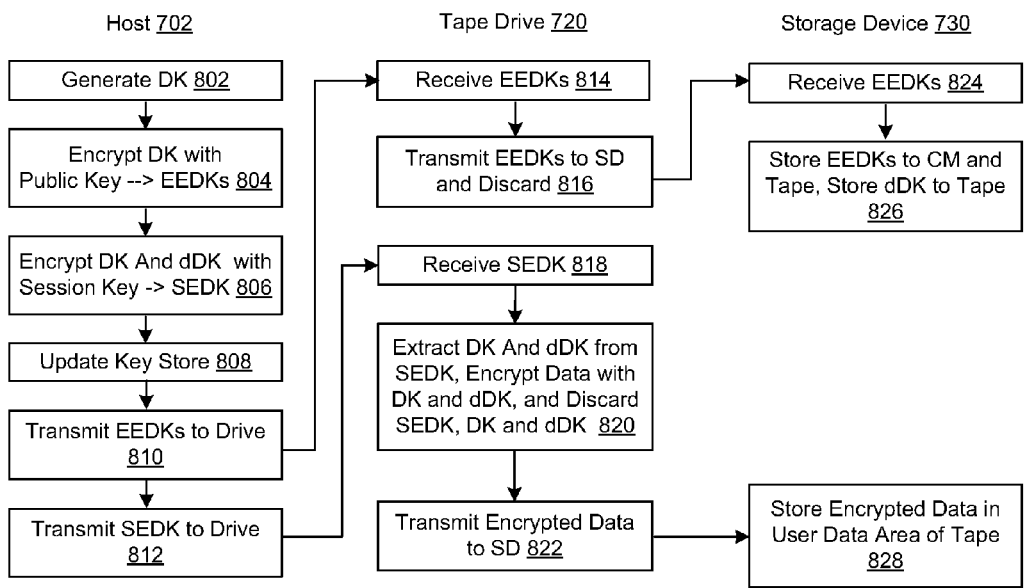
FIG. 8 illustrates logic to securely manage keys in the storage architecture of FIG. 6.

FIG. 8 illustrates logic to securely manage keys in the storage architecture of FIG. 6 using the control logic implemented in the host controller 604 and tape drive controller 626 for securely managing and storing keys and encrypted data in one or more storage devices. When the host 602 generates a data encryption key DK (block 802), it is encrypted with one or more public keys (e.g. a public key of the host or a business partner) to form one or more key-wrapped data keys (a.k.a. EEDKs) (block 804). In certain implementations, the host 602 obtains the public key from a third party, or alternatively, the host 602 can generate the public/private key pair itself. The host 602 also encrypts the DK 608 and the dDK 610 with a public session key (e.g. the tape drive's public key) to form a session encrypted data key (SEDK) (block 806). While generally not required, in some embodiments, the key store or related mechanism may be updated to correlate or track the wrapping key(s) used in forming of any EEDK(s) (block 808). The encrypted data keys (EEDKs and SEDK) are transmitted to the tape drive 622 and discarded from the host 602 (blocks 810, 812).

Upon receiving the EEDKs for a storage device 632 (at block 814), the tape drive controller 626 writes (at block 816) the encrypted data keys (EEDKs) to the storage device 634 and then discards the EEDKs. In addition, once the session encrypted data key (SEDK) is received at the tape drive (block 818), the tape drive controller 626 decrypts the SEDK to extract the data key using the tape drive private session key that corresponds to the public session key, and then uses the extracted DK 608 and dDK 610 to encrypt data being written to the storage device (at block 820). After the data is encrypted and stored, the DK, dDK, and SEDK are discarded and the encrypted data is transmitted to the storage device 632 (at block 822). When the EEDKs are received at the storage device (block 824), they are separately stored in multiple locations in the storage device, such as the cartridge memory and the non-user data area of the tape, and the dDK is stored to predetermined data areas on the tape (block 826). In selected embodiments, the EEDKs and the dDK are written to the storage device 632 prior to storing the encrypted data on the storage device (block 828).

Figure 9:
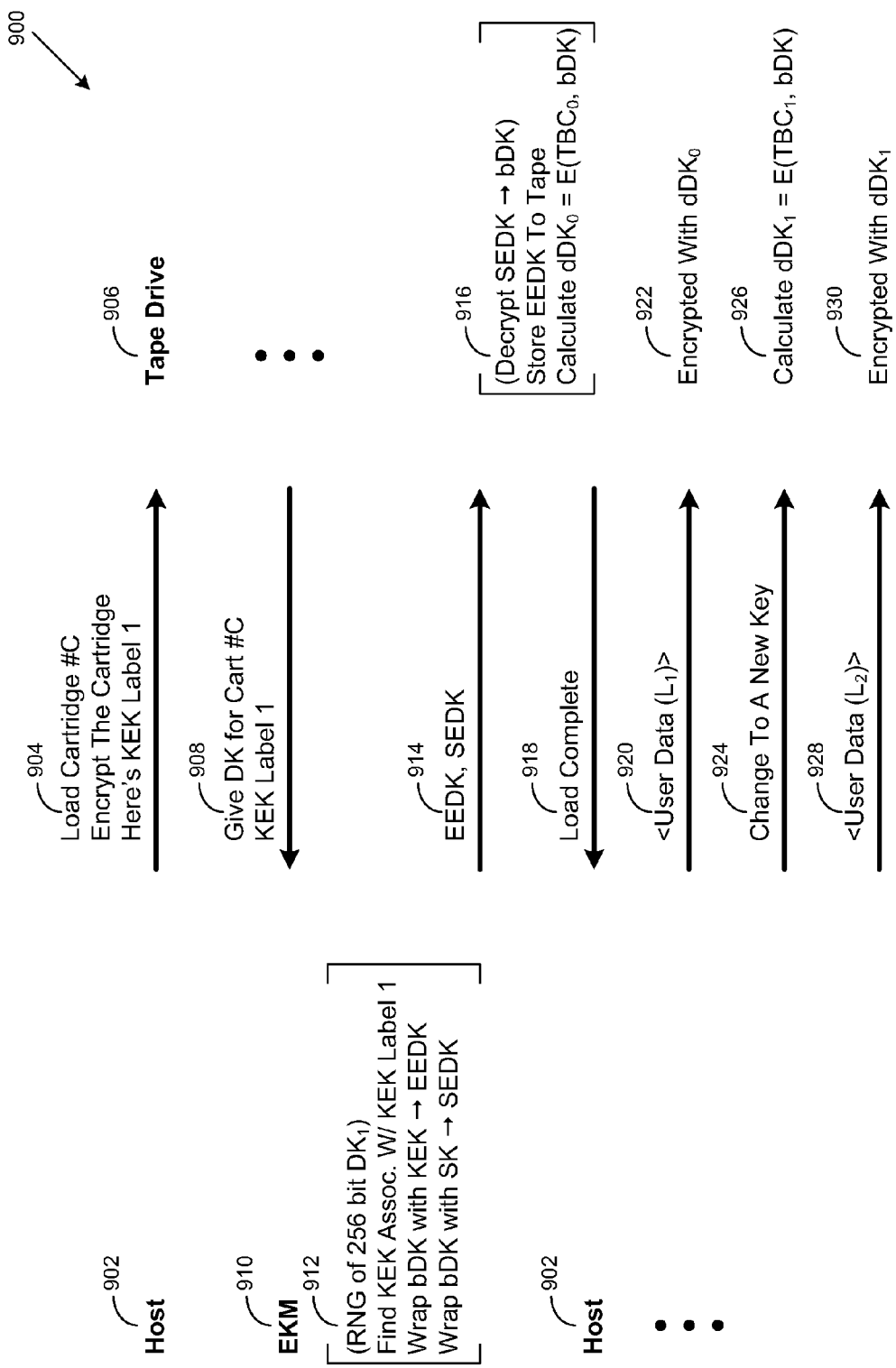
FIG. 9 illustrates the implementation of derived key extensions to wrapped keys for encrypting data on a storage media.

FIG. 9 shows a process diagram illustrating the implementation of derived key extensions to wrapped keys for encrypting data 900 on a storage media. In selected embodiments of the invention, host 902 issues a command 904 to the tape drive 906 to load a predetermined tape cartridge (#C)

The host 902 then issues a command to the tape drive 906 to encrypt the tape cartridge, and then provides a key encryption key (KEK) label 1. The tape drive 906 loads the tape cartridge, retrieves the data key (DK) stored in the cartridge memory (CM) of the storage memory, and returns the DK and the KEK label 1 to the Encryption Key Manager (EKM) 910 in response 908. In process 912, the EKM 910 performs a 256 bit random number generation (RNG) operation on the DK and identifies and retrieves the KEK associated with KEK label 1. Also in process 912, the EKM 910 wraps the retrieved base data key (bDK) with the retrieved KEK to generate an encryption encapsulated data key (EEDK), and wraps the bDK with a session key (SK) to generate a session encrypted data key (SEDK). Once these operations are completed, the EEDK and the SEDK are conveyed by the EKM 910 to the tape drive 906 in data transfer operation 914.

In process 916, the tape drive 906 decrypts the received SEDK as described in greater detail herein to extract the bDK, stores the received EEDK to the storage media, and then performs a cryptographic operation to generate a unique derived key ($dDK_0$). In an embodiment of the invention, $dDK_0$ is generated by performing an encryption operation on the bDK and the total block count ($TBC_0$) of the data to be encrypted. Once generated, $dDK_0$ is stored in the record header of the storage media as described in greater detail herein. In one embodiment, once $dDK_0$ is generated and stored, the tape drive 906 acknowledges to the host 902 in response 918 that loading of cartridge #C is complete and that it is ready to receive user data. In another embodiment, a tape cartridge LoadComplete operation is completed prior to generation and storage of $dDK_0$. Host 902 then provides a first user's data $L_1$ in data transfer operation 920 to tape drive 906, which then encrypts user data $L_1$ with dDK0 in process 922. Once the host 902 completes the transfer of user data $L_1$, it issues a command 924 for the tape drive 906 to change to a new derived key to encrypt a second user's data $L_2$.

In process 926, the tape drive 906 performs a similar cryptographic operation to generate a second derived key $dDK_1$ using the previously decrypted bDK and the total block count ($TBC_1$) of the data to be encrypted. Once process 926 is completed, the tape drive 906 acknowledges to the host 902 that it is ready to receive user data. Host 902 then provides a second user's data $L_2$ in data transfer operation 928 to tape drive 906, which then encrypts user data $L_2$ with $dDK_1$ in process 930. The process then continues in a like manner, using bDK to generate a unique derived key $dDK_x$ for the encryption of each user's data.

Figure 10:
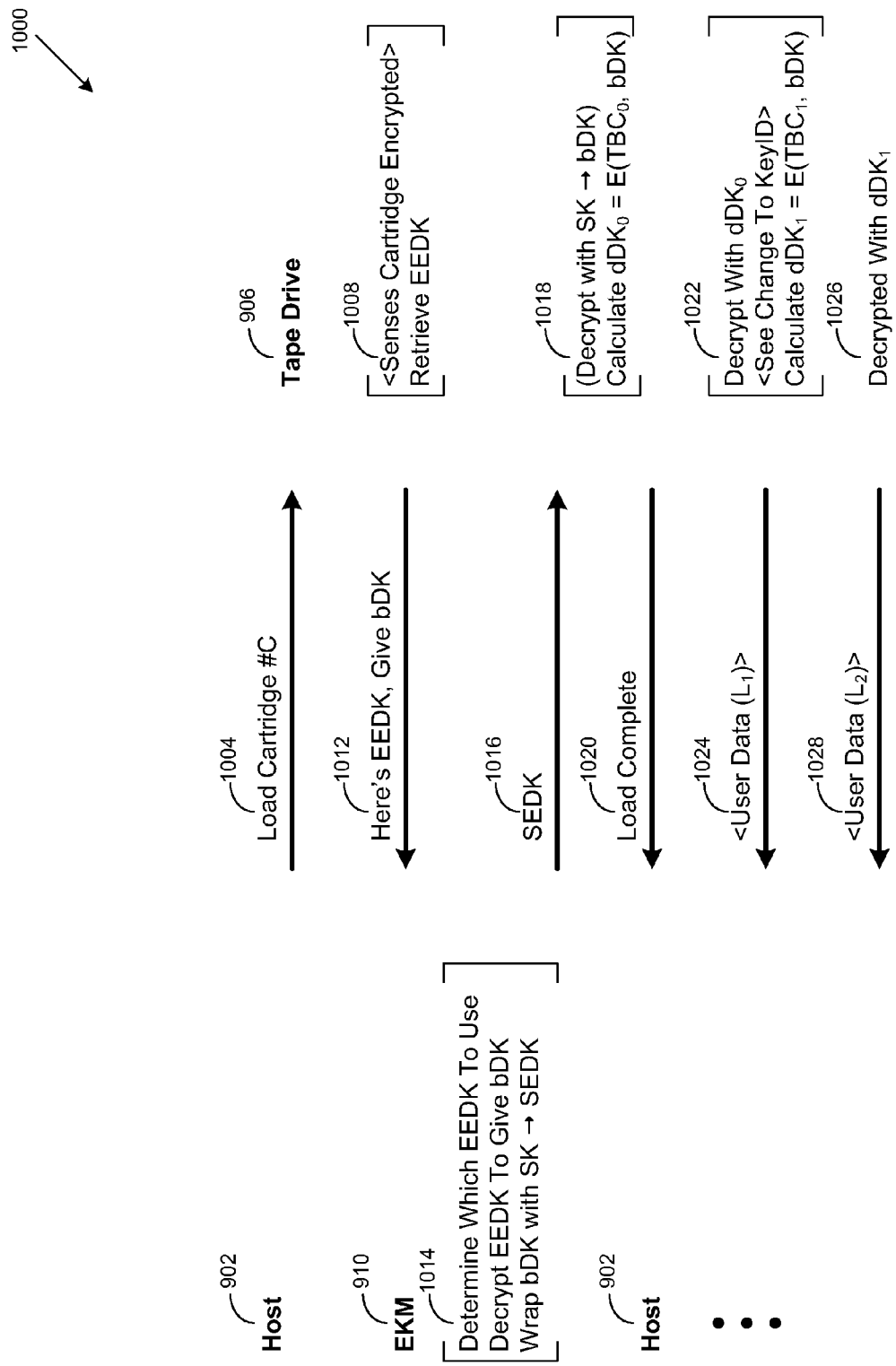
FIG. 10 illustrates the implementation of derived key extensions to wrapped keys for decrypting all data on a storage media.

FIG. 10 shows a process diagram illustrating the implementation of derived key extensions to wrapped keys for decrypting all data 1000 on a storage media. In selected embodiments of the invention, host 902 issues a command 1004 to the tape drive 906 to load a predetermined tape cartridge (#C). The tape drive 906 loads the tape cartridge in process 1008, senses it is encrypted, and retrieves the EEDK. The tape drive then presents the retrieved EEDK to the EKM 910 in response 1012 and requests the EKM 910 return the bDK associated with the EEDKs. In process 1014, the EKM 910 determines which EEDK to use, performs cryptographic operations to decrypt the EEDK and extract the bDK it contains. The bDK is then wrapped in a session key (SK) to generate an SEDK, which is conveyed to the tape drive 906 in data transfer operation 1016. In process 1018, the tape drive 906 decrypts the received SEDK with an SK as described in greater detail herein to extract the bDK, and then performs a cryptographic operation to generate a unique derived key ($dDK_0$). In an embodiment of the invention, $dDK_0$ is generated by performing an encryption operation on the bDK and the total block count ($TBC_0$) of the data to be decrypted. In one embodiment, once $dDK_0$ is generated, the tape drive 906 acknowledges to the host 902 in response 1020 that loading of cartridge #C is complete and that it is ready to transmit user data. In another embodiment, a tape cartridge LoadComplete operation is completed prior to generation of $dDK_0$. Tape drive 906 then decrypts a first user's data with $dDK_0$ in process 1022 and conveys the decrypted data to the host 902 in transfer 1024. If a change in the KeyID is detected in process 1022, the tape drive 906 performs a similar cryptographic operation to generate a second derived key $dDK_1$ using the previously decrypted bDK and the total block count ($TBC_1$) of the second user's data. The tape drive 906 then decrypts the second user's data $L_2$ with $dDK_1$ in process 1026 and conveys it to the host 902 in transfer 1028. The process then continues in a like manner, using bDK to generate a unique derived key $dDK_x$ for the decryption of each user's data.

Figure 11:
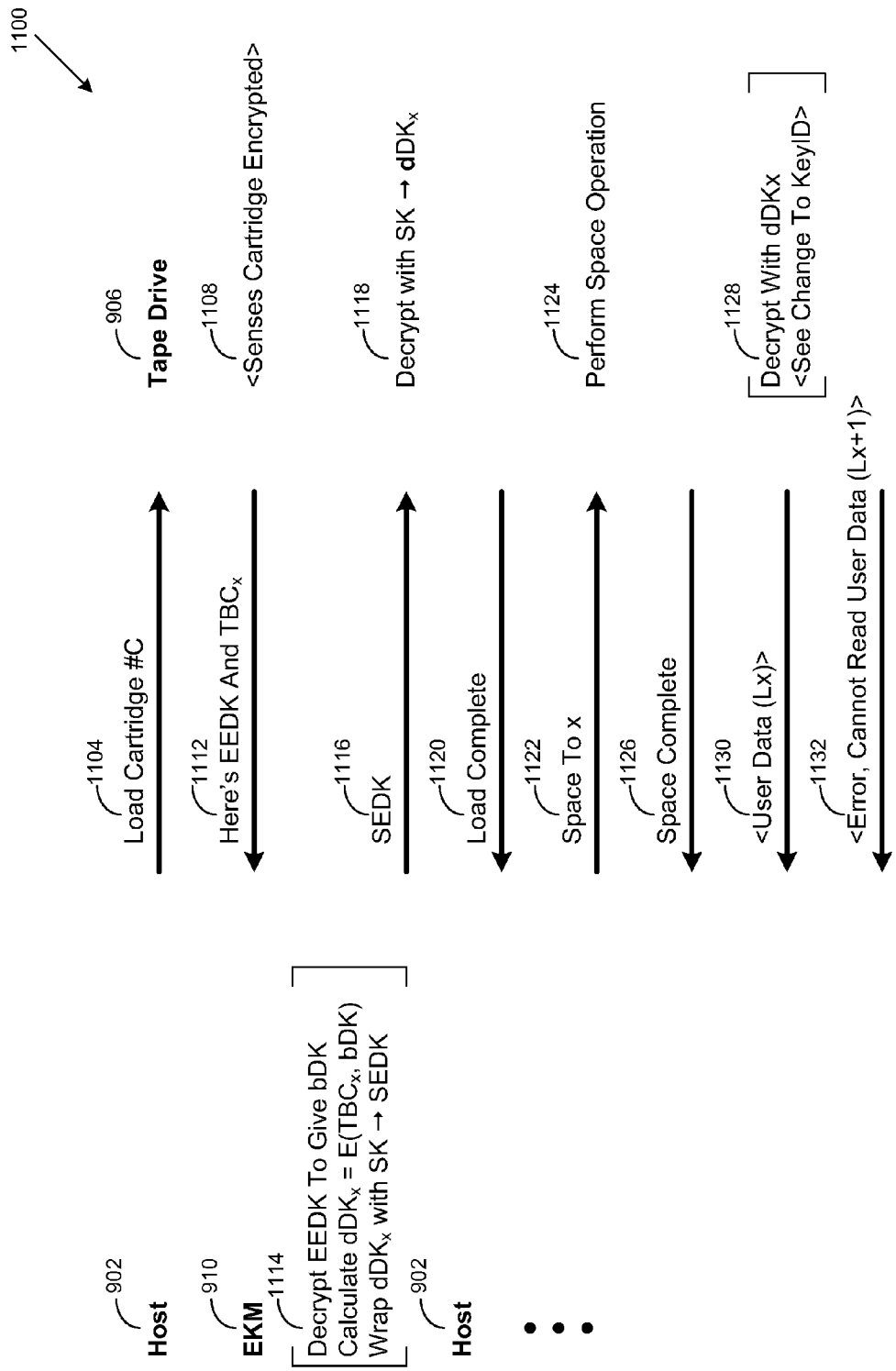
FIG. 11 illustrates the implementation of derived key extensions to wrapped keys for decrypting selected data on a storage media.

FIG. 11 shows a process diagram illustrating the implementation of derived key extensions to wrapped keys for decrypting selected data 1100 on a storage media. In selected embodiments of the invention, host 902 issues a command 1104 to the tape drive 906 to load a predetermined tape cartridge (#C). The tape drive 906 loads the tape cartridge in process 1108, senses it is encrypted, and retrieves the EEDK and a predetermined block count ($TBC_x$). The tape drive then presents the retrieved EEDK and the $TBC_x$ to the EKM 910 in response 1112. In process 1114, the EKM 910 performs cryptographic operations to decrypt the EEDK and extract the bDK it contains. The host 902 then performs additional cryptographic operations on the bDK and $TBC_x$ to generate a predetermined $dDK_x$, which is wrapped in an SK to generate an SEDK, which in turn is conveyed to the tape drive 906 in data transfer operation 1116. In process 1118, the tape drive 906 decrypts the received SEDK with an SK as described in greater detail herein to extract the $dDK_x$.

Once process 1118 is completed, the tape drive 906 acknowledges to the host 902 in response 1120 that loading of cartridge #C is complete and that it is ready to transmit user data. The host 902 then issues a command to the tape drive 906 to advance to a predetermined space (x) on the storage media, and the tape drive 906 performs the requested space operation in process 1124. It will be appreciated that in some cases the drive might not know $TBC_x$ until this space (or locate) command is issued (and then by looking at the argument of the space (or locate) command), or until after it is completed (and then by reading the KeyID of the first record encountered). In either of these cases the steps 1112, 1116, and 1118 described above cannot occur until after steps 1122, or 1124. Once process 1124 is completed, the tape drive 806 acknowledges to the host 902 in response 1126 that loading of cartridge #C is complete and that it is ready to transmit the requested user data. Tape drive 906 then decrypts the requested user's data Lx with derived key $dDK_x$ in process 1128 and conveys the decrypted data Lx to the host 902 in transfer 1130. If a change in the KeyID is detected in process 1128, the tape drive 906 returns an error message in response 1132 that it cannot read the next user's data Lx+1 without the required derived key $dDK_{x+1}$. If a change in the KeyID is detected in process 1317, the tape drive 906 will be unable to decrypt any additional data with derived key $dDK_x$. As a result, the tape drive 906 returns an error message to the host 902 in response 1132 that it cannot read the next user's data $L_{x+1}$ without the required derived key $dDK_{x+1}$.

Figure 12:
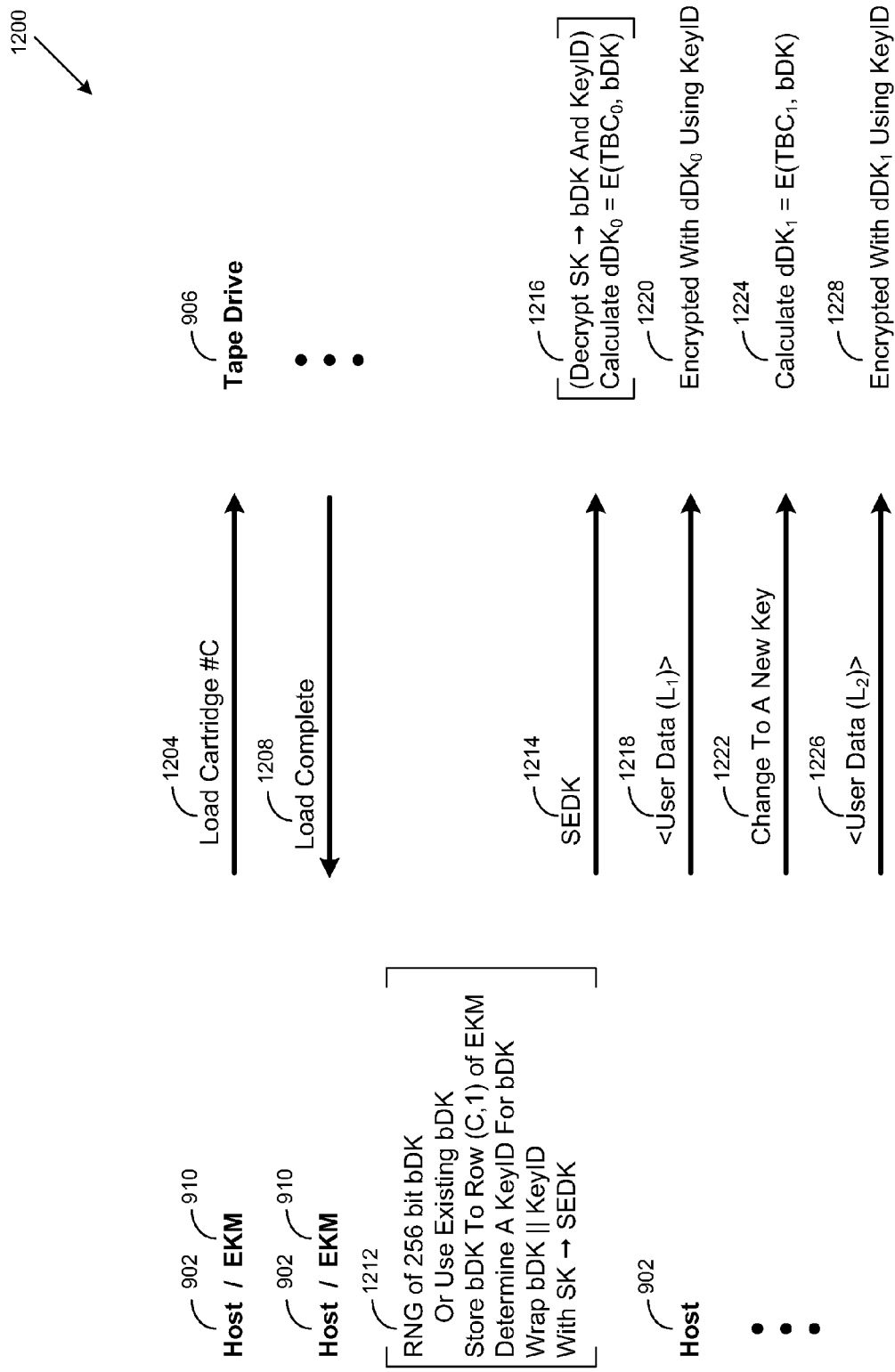
FIG. 12 illustrates the in-band implementation of derived key extensions to direct keys for encrypting data on a storage media.

FIG. 12 shows a process diagram illustrating the in-band implementation of derived key extensions to direct keys for encrypting data 1200 on a storage media. In an embodiment of the invention, host 902 issues a command 1204 to the tape drive 906 to load a predetermined tape cartridge (#C). In another embodiment, EKM 910 issues a similar command 1204 to the tape drive 906 to load a predetermined tape cartridge (#C). In different embodiments, tape drive 906 acknowledges in response 1208 to either host 902 or EKM 910 that the loading of the tape cartridge is completed. In one embodiment, the host 902 performs a 256 bit random number generation (RNG) operation on the base DK (bDK) in process 1212. In another embodiment, the host 902 uses the existing bDK in process 1212. In different embodiments, the resulting RNG value or existing bDK is then stored in row (C,1) of the EKM 910 and a KeyID is generated for bDK as described in greater detail herein. The bDK and the resulting KeyID are then wrapped in a session key (SK) as also described in greater detail herein to generate an SEDK, which is conveyed to the tape drive 906 in data transfer operation 1214. In another embodiment, the EKM 910 performs the same operations in process 1212 and conveys the SEDK to the tape drive 906 in data transfer operation 1214. In process 1216, the tape drive 906 decrypts the received SEDK as described in greater detail herein to extract the bDK and KeyID it contains. The tape drive 906 then performs a cryptographic operation to generate a unique derived key ($dDK_0$). In an embodiment of the invention, $dDK_0$ is generated by performing an encryption operation on the bDK and the total block count ($TBC_0$) of the data to be encrypted. Once generated, $dDK_0$ is stored in the record header of the storage media as described in greater detail herein.

Once process 1216 is completed, loading of cartridge #C is complete and it is ready to receive user data. Host 902 then provides a first user's data $L_1$ in data transfer operation 1218 to tape drive 906, which in process 1220 encrypts the received user data $L_1$ with $dDK_0$ using the previously decrypted KeyID. Once the host 902 completes the transfer of user data $L_1$, it issues a command 1222 for the tape drive 906 to calculate a new derived key to encrypt a second user's data $L_2$. In process 1224, the tape drive 906 performs a similar cryptographic operation to generate a second derived key $dDK_1$ using the previously decrypted bDK and the total block count ($TBC_1$) of the data to be encrypted. Once process 1224 is completed, the tape drive 906 acknowledges to the host 902 that it is ready to receive user data. Host 902 then provides a second user's data $L_2$ in data transfer operation 1226 to tape drive 906, which in process 1228 encrypts user data $L_2$ with $dDK_0$ using the previously decrypted KeyID. The process then continues in a like manner, using bDK to generate a unique derived key $dDK_x$ for the encryption of each user's data.

Figure 13:
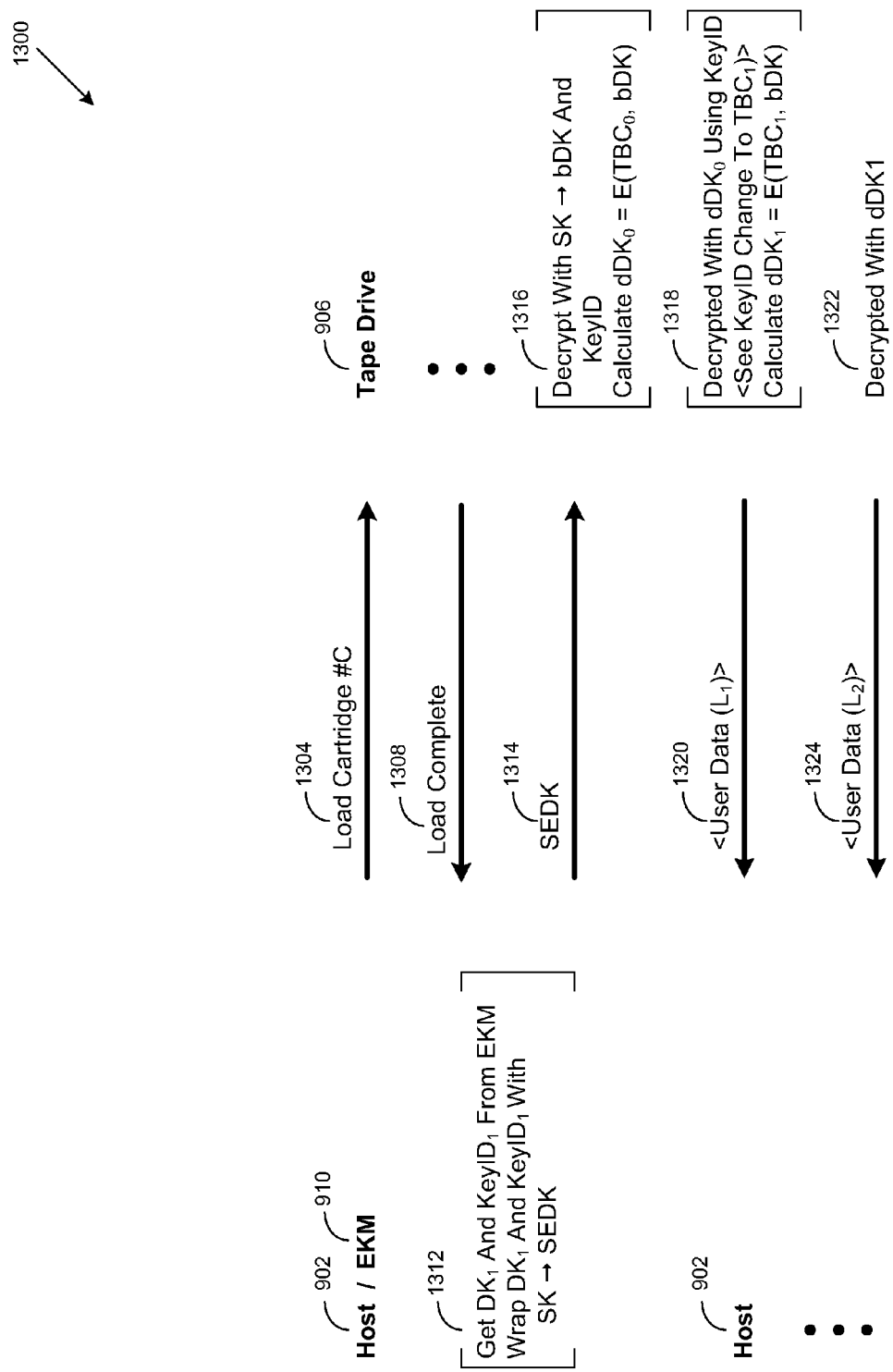
FIG. 13 illustrates the in-band implementation of derived key extensions to wrapped keys for decrypting all data on a storage media.

FIG. 13 shows a process diagram illustrating the in-band implementation of derived key extensions to wrapped keys for decrypting all data 1300 on a storage media. In an embodiment of the invention, host 902 issues a command 1304 to the tape drive 906 to load a predetermined tape cartridge (#C). In another embodiment, EKM 910 issues a similar command 1304 to the tape drive 906 to load a predetermined tape cartridge (#C). In different embodiments, tape drive 906 acknowledges in response 1308 to either host 902 or EKM 910 that the loading of the tape cartridge is completed. In one embodiment, the host 902 retrieves a first data key $dDK_1$ and its corresponding $KeyID_1$ from the EKM 910 in process 1312. The host 902 then wraps the $dDK_1$ and $KeyID_1$ with a session key (SK) to generate an SEDK, which is conveyed to tape drive 906 in data transfer operation 1314. In another embodiment, the EKM 910 performs the same operations in process 1312 and conveys the SEDK to the tape drive 906 in data transfer operation 1314. In process 1316, the tape drive 906 decrypts the received SEDK with an SK as described in greater detail herein to extract the bDK and KeyID, and then performs a cryptographic operation to generate a unique derived key ($dDK_0$). In an embodiment of the invention, $dDK_0$ is generated by performing an encryption operation on the bDK and the total block count ($TBC_0$) of the data to be decrypted.

Once process 1318 is completed, loading of cartridge #C is complete and it is ready to receive user data. Tape drive 906 then decrypts a first user's data L1 with dDK0 using the previously decrypted KeyID, and conveys the decrypted first user's data L1 to the host 902 in transfer 1320. If a change in the KeyID is detected in process 1318, the tape drive 906 performs a similar cryptographic operation to generate a second derived key dDK1 using the previously decrypted bDK and the total block count (TBC1) of the second user's data. The tape drive 906 then decrypts the second user's data L2 with dDK1 in process 1322 and conveys it to the host 902 in transfer 1324. The process then continues in a like manner, using bDK to generate a unique derived key dKx for the decryption of each user's data.

Figure 14:
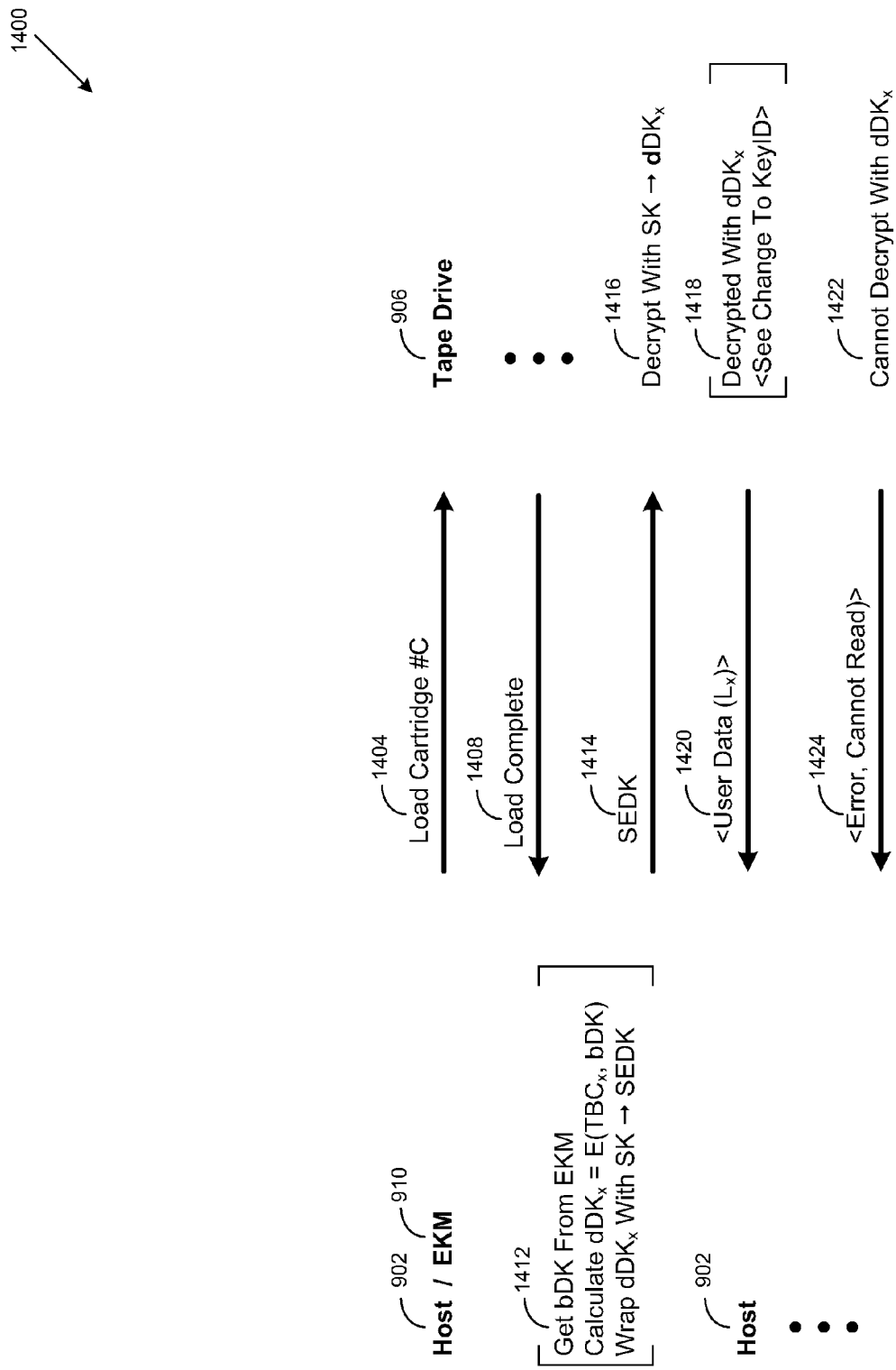
FIG. 14 illustrates the in-band implementation of derived key extensions to wrapped keys for decrypting selected data on a storage media.

FIG. 14 shows a process diagram illustrating the in-band implementation of derived key extensions to wrapped keys for decrypting selected data 1400 on a storage media. In an embodiment of the invention, host 902 issues a command 1404 to the tape drive 906 to load a predetermined tape cartridge (#C). In another embodiment, EKM 910 issues a similar command 1404 to the tape drive 906 to load a predetermined tape cartridge (#C). In different embodiments, tape drive 906 acknowledges in response 1408 to either host 902 or EKM 910 that the loading of the tape cartridge is completed. In one embodiment, the host 902 retrieves a base data key bDK from the EKM 910 in process 1412. The Host 902 then performs cryptographic operations on the bDK and $TBC_x$ to generate a predetermined $dDK_x$, which is wrapped in an SK to generate an SEDK, which in turn is conveyed to the tape drive 906 in data transfer operation 1414. In another embodiment, the EKM 910 performs the same operations in process 1412 and conveys the SEDK to the tape drive 906 in data transfer operation 1414.

In process 1416, the tape drive 906 decrypts the received SEDK with an SK as described in greater detail herein to extract the $dDK_x$. Tape drive 906 then decrypts the requested user's data $L_x$ with derived key $dDK_x$ in process 1028 and conveys the decrypted data $L_x$ to the host 902 in transfer 1420. If a change in the KeyID is detected in process 1418, the tape drive 906 returns an error message in response 1032 that it cannot read the next user's data $L_{x+1}$ without the required derived key $dDK_{x+1}$. If a change in the KeyID is detected in process 1417, the tape drive 906 will be unable to decrypt any additional data with derived key $dDK_x$ in process 1422. As a result, the tape drive 906 returns an error message to the host 902 in response 1424 that it cannot read the next user's data $L_{x+1}$ without the required derived key $dDK_{x+1}$.

Figure 15:
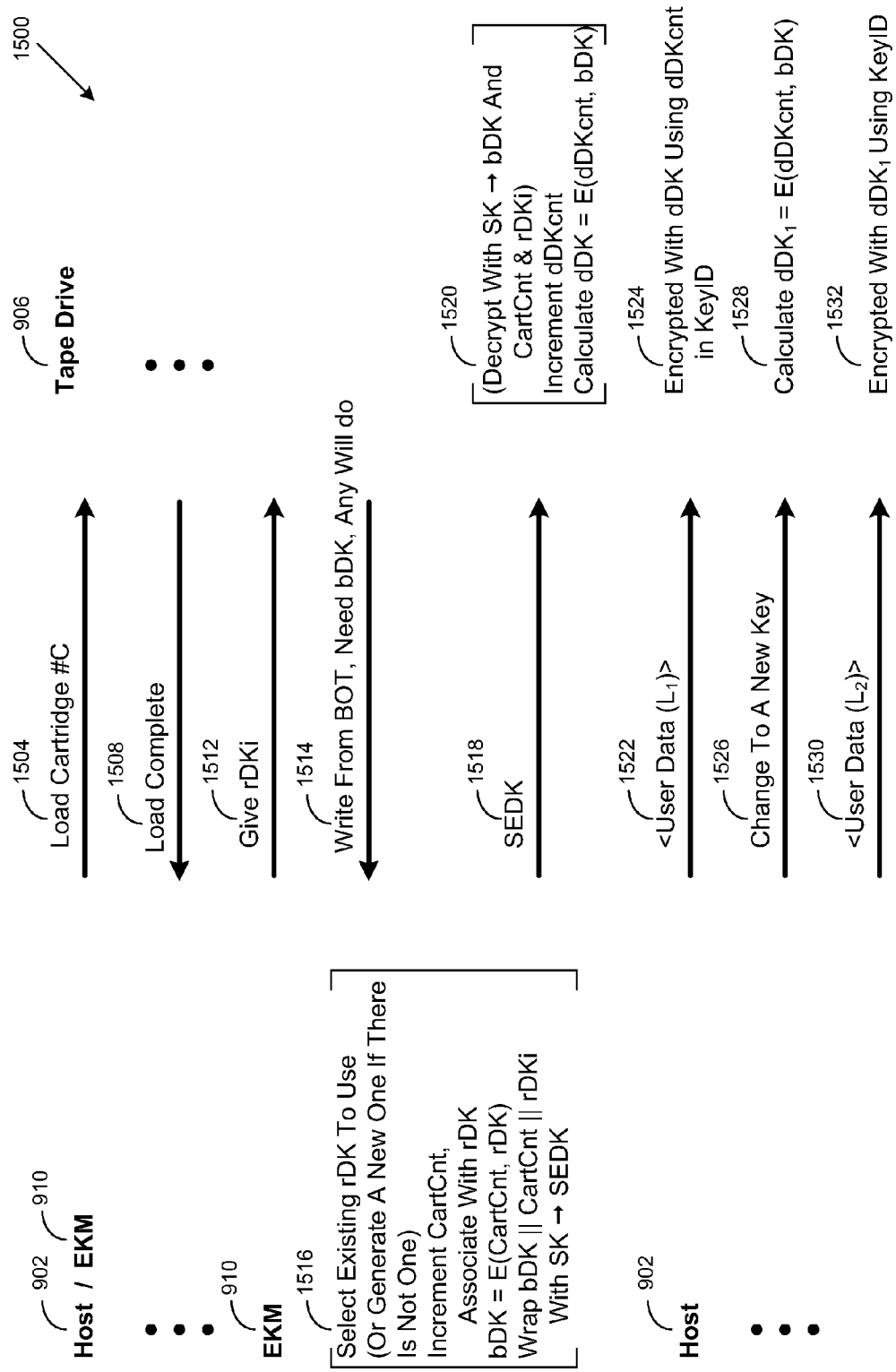
FIG. 15 illustrates the in-band implementation of derived key extensions to direct keys for encrypting data from beginning of tape (BOT) on a storage media.

FIG. 15 shows a process diagram illustrating the in-band implementation of derived key extensions to direct keys for encrypting data 1500 from beginning of tape (BOT) on a storage media. In an embodiment of the invention, host 902 issues a command 1504 to the tape drive 906 to load a predetermined tape cartridge (#C). In another embodiment, EKM 910 issues a similar command 1504 to the tape drive 906 to load a predetermined tape cartridge (#C). In different embodiments, tape drive 906 acknowledges in response 1508 to either host 902 or EKM 910 that the loading of the tape cartridge is completed. EKM 910 performs cryptographic operations on the root data key comprising its data store to generate an index (rDKi), which is conveyed to tape drive 906 in data transfer operation 1512. Tape drive 906 receives the rDKi and to initiate a write operation from BOT, requests a based data key (bDK) from EKM 910 in response 1514. In one embodiment, EKM 910 selects and existing rDK from its data store in process 1516. In another embodiment, EKM 910 performs a random number generation (RNG) operation to generate a new rDK in process 1516.

Then the number of tape cartridges (CartCnt) that were previously served keys based on the selected rDK is incremented by one (CartCnt+1) and then associated with the selected rDK. The EKM 910 then performs cryptographic operations on the incremented CartCnt and the rDK to generate a bDK as described in greater detail herein. The bDK, CartCnt and rDKi are then wrapped in a session key (SK) as also described in greater detail herein to generate an SEDK, which is conveyed to the tape drive 906 in data transfer operation 1518. In process 1520 the tape drive 906 decrypts the received SEDK as described in greater detail herein to extract the bDK, CartCnt and rDKi it contains. The tape drive 906 then increments the number of derived data keys (dDKcnt) implemented within the mounted tape cartridge. Once the dDKcnt is incremented, the tape drive 906 performs a cryptographic operation to generate a unique derived key dDK. In an embodiment of the invention, dDK is generated by performing an encryption operation on the bDK and the previously incremented dDKcnt. Once generated, dDK is stored in the record header of the storage media as described in greater detail herein.

Once process 1520 is completed, loading of cartridge #C is complete and it is ready to receive user data. Host 902 then provides a first user's data $L_1$ in data transfer operation 1522 to tape drive 906, which in process 1524 encrypts the received user data $L_1$ with dDK using the previously incremented dDKcnt in the KeyID. Once the host 902 completes the transfer of user data $L_1$, it issues a command 1526 for the tape drive 906 to calculate a new derived key to encrypt a second user's data $L_2$. In process 1528, the tape drive 906 performs a similar cryptographic operation to generate a second derived key $dDK_1$ using the previously decrypted bDK and the dDKcnt. Once process 1528 is completed, the tape drive 906 acknowledges to the host 902 that it is ready to receive user data. Host 902 then provides a second user's data L2 in data transfer operation 1530 to tape drive 906, which in process 1532 encrypts user data L2 with $dDK_1$ using the dDKcnt in the KeyID. The process then continues in a like manner, using bDK and dDKcnt to generate a unique derived key $dDK_x$ for the encryption of each user's data.

Figure 16:
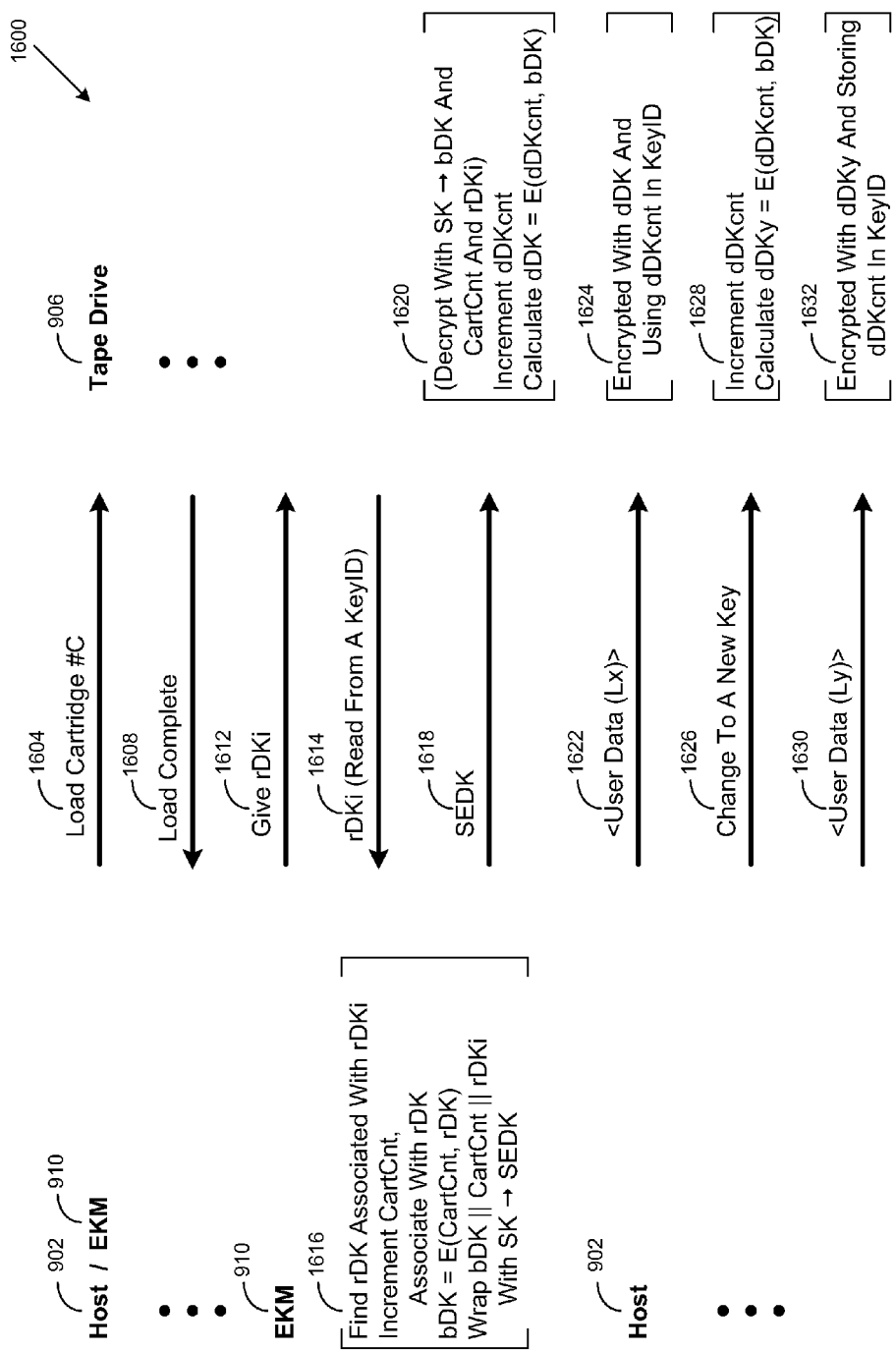
FIG. 16 illustrates the in-band implementation of derived key extensions to direct keys for appending encrypted data on a partially written storage media.

FIG. 16 shows a process diagram illustrating the in-band implementation of derived key extensions to direct keys for appending encrypted data 1600 on a partially written storage media. In an embodiment of the invention, host 902 issues a command 1604 to the tape drive 906 to load a predetermined tape cartridge (#C). In another embodiment, EKM 910 issues a similar command 1604 to the tape drive 906 to load a predetermined tape cartridge (#C). In different embodiments, tape drive 906 acknowledges in response 1608 to either host 902 or EKM 910 that the loading of the tape cartridge is completed. EKM 910 performs cryptographic operations on the root data key comprising its data store to generate an index (rDKi), which is conveyed to tape drive 906 in data transfer operation 1612. Tape drive 906 receives the rDKi, and to initiate an append tape write operation, acknowledges in response 1614 to the EKM 910 that it has located a Key ID comprising the provided rDKi.

Upon receipt of the acknowledgement, the EKM 910 retrieves the rDK associated with the rDKi from its data store in process 1616. Then the number of tape cartridges (CartCnt) that were previously served keys based on the selected rDK is incremented by one (CartCnt+1) and then associated with the selected rDK. The EKM 910 then performs cryptographic operations on the incremented CartCnt and the rDK to generate a bDK as described in greater detail herein. The bDK, CartCnt and rDKi are then wrapped in a session key (SK) as also described in greater detail herein to generate an SEDK, which is conveyed to the tape drive 906 in data transfer operation 1618. In process 1620 the tape drive 906 decrypts the received SEDK as described in greater detail herein to extract the bDK, CartCnt and rDKi it contains. The tape drive 906 then increments the number of derived data keys (dDKcnt) implemented within the mounted tape cartridge. Once the dDKcnt is incremented, the tape drive 906 performs a cryptographic operation to generate a unique derived key dDK. In an embodiment of the invention, dDK is generated by performing an encryption operation on the bDK and the previously incremented dDKcnt. Once generated, dDK is stored in the record header of the storage media as described in greater detail herein.

Once process 1620 is completed, loading of cartridge #C is complete and it is ready to receive user data. Host 902 then provides a first user's data $L_1$ in data transfer operation 1622 to tape drive 906, which in process 1624 encrypts the received user data Lx with dDK using the previously incremented dDKcnt in the KeyID. Once the host 902 completes the transfer of user data $L_x$, it issues a command 1426 for the tape drive 906 to calculate a new derived key to encrypt a second user's data $L_y$. In process 1628, the tape drive 906 increments dDKcnt by one (dDKcnt+1) and performs a similar cryptographic operation to generate a second derived key $dDK_y$ using the previously decrypted bDK and the newly incremented dDKcnt. Once process 1628 is completed, the tape drive 906 acknowledges to the host 902 that it is ready to receive user data. Host 902 then provides a second user's data $L_y$ in data transfer operation 1630 to tape drive 906, which in process 1632 encrypts user data $L_y$ with $dDK_y$ using the newly incremented dDKcnt in the KeyID. The process then continues in a like manner, using bDK and dDKcnt in the KeyID to generate a unique derived key $dDK_y$ for the encryption of each user's data.

Figure 17:
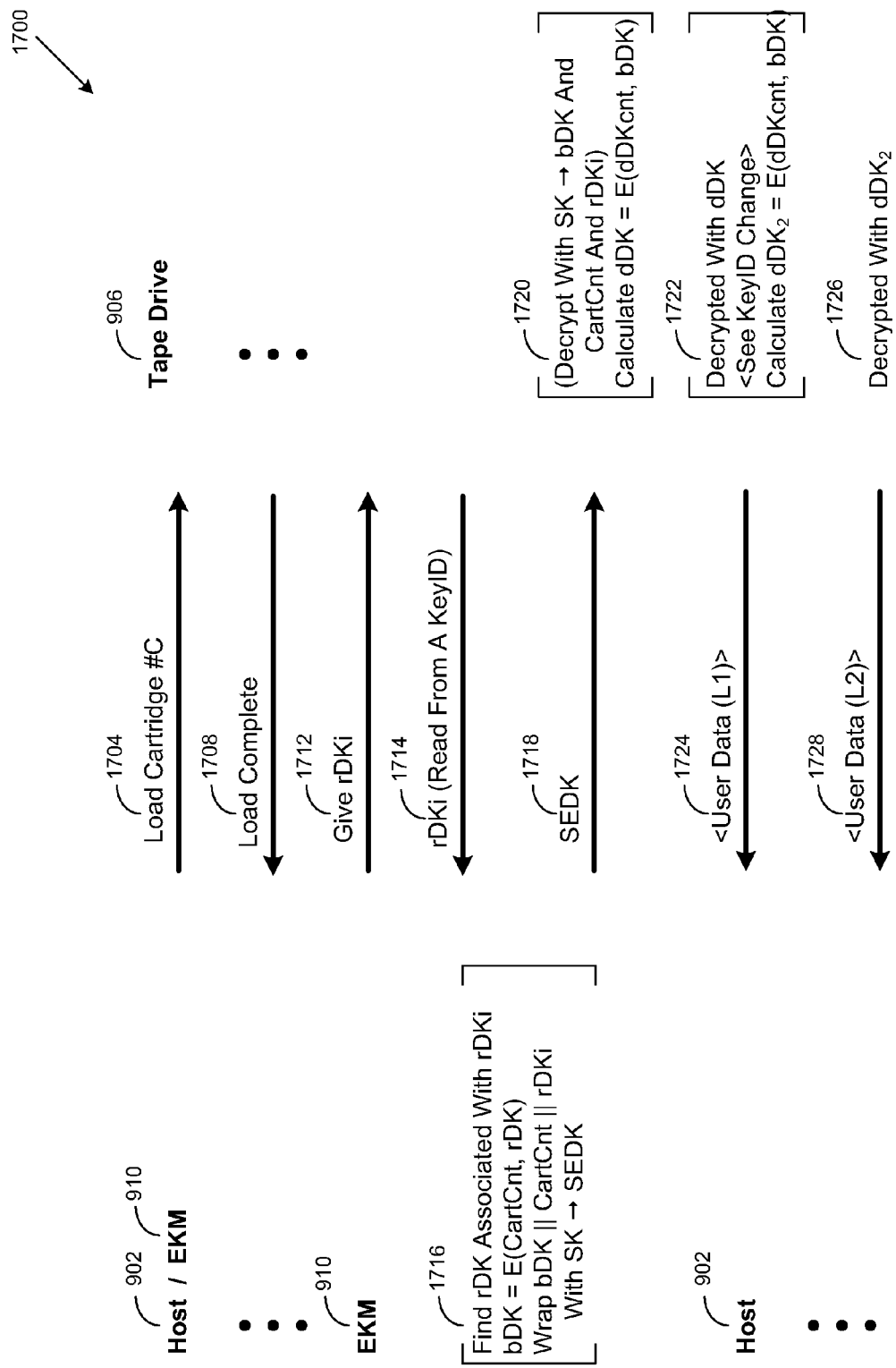
FIG. 17 illustrates the in-band implementation of derived key extensions to direct keys for decrypting all data on a storage media.

FIG. 17 shows a process diagram illustrating the in-band implementation of derived key extensions to direct keys for decrypting all data 1700 on a storage media. In an embodiment of the invention, host 902 issues a command 1704 to the tape drive 906 to load a predetermined tape cartridge (#C). In another embodiment, EKM 910 issues a similar command 1704 to the tape drive 906 to load a predetermined tape cartridge (#C). In different embodiments, tape drive 906 acknowledges in response 1708 to either host 902 or EKM 910 that the loading of the tape cartridge is completed. EKM 910 performs cryptographic operations on the root data key comprising its data store to generate an index (rDKi), which is conveyed to tape drive 906 in data transfer operation 1712. Tape drive 906 receives the rDKi and to initiate a read operation of the tape cartridge, acknowledges in response 1714 to the EKM 910 that it has located a Key ID comprising the provided rDKi.

Upon receipt of the acknowledgement, the EKM 910 retrieves the rDK associated with the rDKi from its data store in process 1716. Then the number of tape cartridges (CartCnt) that were previously served keys based on the selected rDK is determined and associated with the selected rDK. The EKM 910 then performs cryptographic operations on the CartCnt and the selected rDK to generate a bDK as described in greater detail herein. The bDK, CartCnt and rDKi are then wrapped in a session key (SK) as also described in greater detail herein to generate an SEDK, which is conveyed to the tape drive 906 in data transfer operation 1718. In process 1720 the tape drive 906 decrypts the received SEDK as described in greater detail herein to extract the bDK, CartCnt and rDKi it contains. The tape drive 906 then performs a cryptographic operation to generate a unique derived key dDK. In an embodiment of the invention, dDK is generated by performing an encryption operation on the bDK and the dDKcnt.

Once process 1720 is completed, loading of cartridge #C is complete and it is ready to decrypt user data. Tape drive 906 then decrypts a first user's data $L_1$ in process 1722 using dDK and conveys the decrypted data $L_1$ to host 902 in data transfer operation 1724. The tape drive 906 then decrypts the first user's data $L_1$ with derived key dDK in process 1722 and conveys the decrypted data $L_1$ to the host 902 in transfer 1724. If a change in the KeyID is detected in process 1722, the tape drive 906 performs a similar cryptographic operation to generate a second derived key dDK2 using the previously decrypted bDK and the dDKcnt. Tape drive 906 then decrypts a second user's data $L_2$ in process 1726 using $dDK_2$ and conveys the decrypted data $L_2$ to host 902 in data transfer operation 1724. The process then continues in a like manner, using bDK and dDKcnt to generate a unique derived key $dDK_x$ for the decryption of each user's data.

Figure 18:
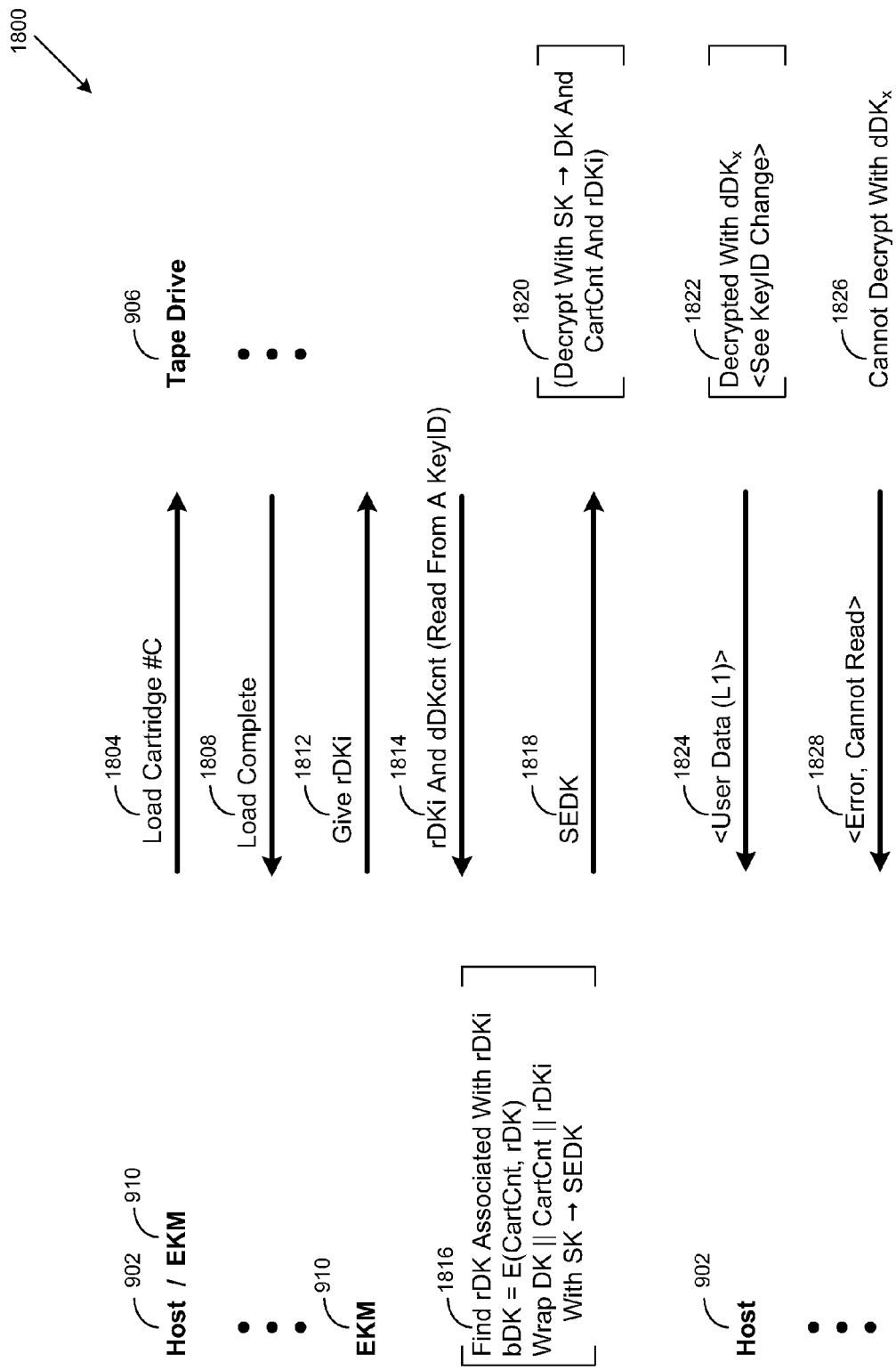
FIG. 18 illustrates the in-band implementation of derived key extensions to direct keys for decrypting selected data on a storage media.

FIG. 18 shows a process diagram illustrating the in-band implementation of derived key extensions to direct keys for decrypting selected data 1800 on a storage media. In an embodiment of the invention, host 902 issues a command 1804 to the tape drive 906 to load a predetermined tape cartridge (#C). In another embodiment, EKM 910 issues a similar command 1804 to the tape drive 906 to load a predetermined tape cartridge (#C). In different embodiments, tape drive 906 acknowledges in response 1808 to either host 902 or EKM 910 that the loading of the tape cartridge is completed. EKM 910 performs cryptographic operations on the root data key comprising its data store to generate an index (rDKi), which is conveyed to tape drive 906 in data transfer operation 1812. Tape drive 906 receives the rDKi, and to initiate a selected read operation of the tape cartridge, returns in response 1814 to the EKM 910 the provided rDKi and a derived DK count (dDKcnt) comprising a KeyID that it has located on a predetermined tape cartridge.

Upon receipt of the acknowledgement, the EKM 910 retrieves the rDK associated with the rDKi from its data store in process 1816. Then the number of tape cartridges (CartCnt) that were previously served keys based on the selected rDK is determined and associated with the selected rDK. The EKM 910 then performs cryptographic operations on the CartCnt and the selected rDK to generate a bDK as described in greater detail herein. The DK, CartCnt and rDKi are then wrapped in a session key (SK) as also described in greater detail herein to generate an SEDK, which is conveyed to the tape drive 906 in data transfer operation 1818. In process 1820 the tape drive 906 decrypts the received SEDK as described in greater detail herein to extract the DK, CartCnt and rDKi it contains.

Once process 1820 is completed, loading of cartridge #C is complete and it is ready to decrypt user data. The tape drive 906 then decrypts the first user's data $L_x$ with derived key $dDK_x$ in process 1622 and conveys the decrypted data $L_x$ to the host 902 in transfer 1824. If a change in the KeyID is detected in process 1822, the tape drive 906 will be unable to decrypt any additional data with derived key $dDK_x$ in process 1826. As a result, the tape drive 906 returns an error message to the host 902 in response 1828 that it cannot read the next user's data $L_{x+1}$ without the required derived key $dDK_{x+1}$.

As will be appreciated by one skilled in the art, the present invention may be embodied in whole or in part as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. For example, the functions of tape drive 216 and tape cartridge 100 may be implemented in software commonly referred to as a virtual tape library. The virtual tape library software may communicate with EKM/Host 202 and mimic the functions of a physical tape library, including the functions of reading from and writing to a storage device, such as a tape drive. The virtual tape library software may reside on a separate computer system coupled to EKM/Host 202.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A data storage device comprising:
a data storage drive for writing data to a storage medium, the storage medium comprising a magnetic tape housed in a data storage cartridge and a cartridge memory housed in the data storage cartridge; and
a controller coupled to the data storage drive, the controller being configured to process a plurality of derived data keys, the plurality of derived data keys being derived from a first data key, the controller using the plurality of derived data keys as encryption keys for encrypting respective user data to provide respective encrypted user data and writing the respective encrypted user data to respective portions of the magnetic tape housed in the data storage cartridge of the storage medium; and wherein
the controller is configured to direct the data storage drive to store each of the plurality of derived data keys in one or more locations on the magnetic tape; and,
the respective encrypted user data is written to respective portions on the magnetic tape; and wherein
at least one copy of the encryption key is stored in wrapped form on the storage cartridge;
at least one of the plurality of derived data keys is stored in wrapped form in at least one location on the magnetic tape; and,
the at least one location on the magnetic tape comprises a non-user data area.

2. The data storage device of claim 1, wherein:
the first data key is generated external to the data storage device.

3. The data storage device of claim 2, wherein;
the first data key is generated at an encryption key manager.

4. The data storage device of claim 1 wherein:
the first data key is generated within the data storage device.

5. The data storage device of claim 1 wherein:
the plurality of derived data keys are generated external to the data storage device.

6. The data storage device of claim 5, wherein:
the plurality of derived data keys are generated at an encryption key manager.

7. The data storage device of claim 1 wherein:
the plurality of derived data keys are generated within the data storage device.

8. The data storage device of claim 1, wherein:
the first data key is managed by an encryption key manager.

9. The data storage device of claim 1, wherein:
the first data key is managed by a software application.

10. The data storage device of claim 1, wherein:
the plurality of derived data keys are operable to encrypt all encrypted data stored on the storage medium.

11. The data storage device of claim 1, wherein:
the plurality of derived data keys are operable to encrypt subsets of encrypted data stored on the storage medium.

12. The data storage device of claim 1, wherein:
the plurality of derived data keys are calculated using the first data key and values stored in a KeyID field of respective encrypted record headers.

13. The data storage device of claim 12, wherein:
the plurality of derived data keys are calculated by an encryption key manager performing one or more cryptographic operations on predetermined information.

14. The data storage device of claim 1, wherein:
at least one copy of the encryption key is stored in wrapped form on the storage cartridge.

15. The data storage device of claim 14, wherein:
at least one copy of the derived data key is stored in wrapped form in at least one location on the magnetic tape.

16. A data storage device comprising:
a data storage drive for reading data from a storage medium, the storage medium comprising a magnetic tape housed in a data storage cartridge and a cartridge memory housed in the data storage cartridge; and
a controller coupled to the data storage drive, the controller being configured to process a plurality of derived data keys, the plurality of derived data keys being derived from a first data key, the controller using the derived data keys as a decryption key for decrypting previously encrypted user data to provide decrypted user data, the previously encrypted user data being selectively written to the magnetic tape housed in the data storage cartridge of the storage medium; and wherein
the controller is configured to direct the data storage drive to store each of the plurality of derived data keys in one or more locations on the magnetic tape;
the respective encrypted user data is read from respective portions on the magnetic tape;
at least one copy of the encryption key is stored in wrapped form on the storage cartridge;
at least one of the plurality of derived data keys is stored in wrapped form in at least one location on the magnetic tape; and,
the at least one location on the magnetic tape comprises a non-user data area.

17. The data storage device of claim 16, wherein:
the first data key is generated external to the data storage device.

18. The data storage device of claim 17, wherein:
the first data key is generated at an encryption key manager.

19. The data storage device of claim 16 wherein:
the first data key is generated within the data storage device.

20. The data storage device of claim 16 wherein:
the plurality of derived data keys are generated external to the data storage device.

21. The data storage device of claim 20, wherein:
the plurality of derived data keys are generated at an encryption key manager.

22. The data storage device of claim 16 wherein:
the plurality of derived data keys are generated within the data storage device.

23. The data storage device of claim 16, wherein:
the first data key is managed by an encryption key manager.

24. The data storage device of claim 16, wherein:
the first data key is managed by a software application.

25. The data storage device of claim 16, wherein:
the plurality of derived data keys are operable to encrypt all encrypted data stored on the storage medium.

26. The data storage device of claim 16, wherein:
the plurality of derived data keys are operable to encrypt subsets of encrypted data stored on the storage medium.

27. The data storage device of claim 16, wherein:
the plurality of derived data keys are calculated using the first data key and values stored in a KeyID field of respective encrypted record headers.

28. The data storage device of claim 27, wherein:
the plurality of derived data keys are calculated by an encryption key manager performing one or more cryptographic operations on predetermined information.

29. The data storage device of claim 16, wherein:
at least one copy of the encryption key is stored in wrapped form on the storage cartridge.

30. The data storage device of claim 29, wherein:
at least one copy of the derived data key is stored in wrapped form in at least one location on the magnetic tape.

* * * * *